(12) United States Patent
Bryant et al.

(10) Patent No.: US 11,966,982 B2
(45) Date of Patent: *Apr. 23, 2024

(54) SYSTEMS AND METHODS FOR AUTOMATICALLY MITIGATING RISK OF PROPERTY DAMAGE

(71) Applicant: STATE FARM MUTUAL AUTOMOBILE INSURANCE COMPANY, Bloomington, IL (US)

(72) Inventors: Ronny S. Bryant, Bloomington, IL (US); Shawn M. Call, Bloomington, IL (US); Daryoush Hakimi-Boushehri, Bloomington, IL (US); John H. Weekes, Bloomington, IL (US); Jennifer Criswell, Bloomington, IL (US); Todd Binion, Bloomington, IL (US); Jackie O. Jordan, II, Bloomington, IL (US); Elisabeth McDermeit, Bloomington, IL (US); John Donovan, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 31 days.

This patent is subject to a terminal disclaimer.

(21) Appl. No.: 17/828,479

(22) Filed: May 31, 2022

(65) Prior Publication Data

US 2022/0292611 A1 Sep. 15, 2022

Related U.S. Application Data

(63) Continuation of application No. 17/077,781, filed on Oct. 22, 2020, now Pat. No. 11,379,924, which is a
(Continued)

(51) Int. Cl.
*G06Q 40/08* (2012.01)
*E03B 7/07* (2006.01)
(Continued)

(52) U.S. Cl.
CPC .............. *G06Q 40/08* (2013.01); *E03B 7/071* (2013.01); *G05B 15/02* (2013.01); *G06Q 10/10* (2013.01);
(Continued)

(58) Field of Classification Search
CPC ........ G05B 15/02; G06Q 40/08; G06Q 50/16; G06Q 10/10; G06Q 30/02
See application file for complete search history.

(56) References Cited

U.S. PATENT DOCUMENTS

| 1,005,793 A | 10/1911 | Atkinson |
| 3,648,326 A | 3/1972 | Gaysowski |

(Continued)

FOREIGN PATENT DOCUMENTS

| CN | 202865924 U | 4/2013 |
| CN | 111626536 A | 9/2020 |

(Continued)

OTHER PUBLICATIONS

U.S. Appl. No. 14/873,722, Nonfinal Office Action, dated Oct. 9, 2018.
(Continued)

*Primary Examiner* — Scott S Trotter
(74) *Attorney, Agent, or Firm* — MARSHALL, GERSTEIN & BORUN LLP

(57) ABSTRACT

Methods and systems for automatically mitigating risks of insurance-related events to a property are provided. According to certain aspects, a smart home controller or insurance provider remote processor may analyze data received from a plurality of smart devices disposed on, within, or proxi-
(Continued)

mate to a property, as well as data received from an insurance provider. If it is determined that an actual or potential risk of property damage exists, the smart home controller or insurance provider remote processor may automatically issue commands to one or more smart devices to take actions that mitigate the risk. The smart home controller may also transmit information about the actual or potential risks and any mitigative actions to an insurance provider. The insurance provider remote processor may interpret the transmitted data to perform insurance activities, such as providing a discount and/or adjusting an insurance premium or policy associated with the property.

20 Claims, 8 Drawing Sheets

Related U.S. Application Data continuation of application No. 16/038,310, filed on Jul. 18, 2018, now Pat. No. 10,846,800, which is a continuation of application No. 14/693,032, filed on Apr. 22, 2015, now Pat. No. 10,102,585.

(60) Provisional application No. 62/073,695, filed on Oct. 31, 2014, provisional application No. 62/061,003, filed on Oct. 7, 2014, provisional application No. 62/061,018, filed on Oct. 7, 2014, provisional application No. 62/061,007, filed on Oct. 7, 2014, provisional application No. 62/061,009, filed on Oct. 7, 2014, provisional application No. 62/061,012, filed on Oct. 7, 2014, provisional application No. 62/061,016, filed on Oct. 7, 2014, provisional application No. 62/060,777, filed on Oct. 7, 2014, provisional application No. 62/060,808, filed on Oct. 7, 2014, provisional application No. 62/060,847, filed on Oct. 7, 2014, provisional application No. 62/061,000, filed on Oct. 7, 2014, provisional application No. 62/012,008, filed on Jun. 13, 2014, provisional application No. 61/984,541, filed on Apr. 25, 2014.

(51) Int. Cl.
| | |
|---|---|
| G05B 15/02 | (2006.01) |
| G06Q 10/10 | (2023.01) |
| G06Q 30/02 | (2023.01) |
| G06Q 50/16 | (2012.01) |
| G06Q 50/163 | (2024.01) |
| G08B 21/20 | (2006.01) |
| G16Y 10/50 | (2020.01) |
| H04L 12/28 | (2006.01) |
| G08B 21/04 | (2006.01) |
| G16Y 40/10 | (2020.01) |

(52) U.S. Cl.
CPC ......... *G06Q 30/0278* (2013.01); *G06Q 50/16* (2013.01); *G06Q 50/163* (2013.01); *G08B 21/20* (2013.01); *G16Y 10/50* (2020.01); *H04L 12/2823* (2013.01); *H04L 12/2827* (2013.01); *G05B 2219/163* (2013.01); *G05B 2219/2642* (2013.01); *G08B 21/043* (2013.01); *G16Y 40/10* (2020.01); *H04L 12/2803* (2013.01)

(56) References Cited

U.S. PATENT DOCUMENTS

| | | |
|---|---|---|
| 3,740,739 A | 6/1973 | Griffin et al. |
| 3,771,823 A | 11/1973 | Schnarr |
| 3,817,161 A | 6/1974 | Koplon |
| 3,875,612 A | 4/1975 | Poitras |
| 3,934,306 A | 1/1976 | Farris |
| 4,066,072 A | 1/1978 | Cummins |
| 4,418,712 A | 12/1983 | Braley |
| 4,688,026 A | 8/1987 | Scribner et al. |
| 5,005,125 A | 4/1991 | Farrar et al. |
| 5,038,268 A | 8/1991 | Krause et al. |
| 5,099,751 A | 3/1992 | Newman et al. |
| 5,128,859 A | 7/1992 | Carbone et al. |
| 5,267,587 A | 12/1993 | Brown |
| 5,554,433 A | 9/1996 | Perrone et al. |
| 5,576,952 A | 11/1996 | Stutman et al. |
| 5,684,710 A | 11/1997 | Ehlers et al. |
| 5,903,426 A | 5/1999 | Ehling |
| 5,935,251 A | 8/1999 | Moore |
| 5,979,607 A | 11/1999 | Allen |
| 6,023,762 A | 2/2000 | Dean et al. |
| 6,084,367 A | 7/2000 | Landert |
| 6,104,831 A | 8/2000 | Ruland |
| 6,155,324 A | 12/2000 | Elliott et al. |
| 6,222,455 B1 | 4/2001 | Kaiser |
| 6,237,618 B1 | 5/2001 | Kushner |
| 6,286,682 B1 | 9/2001 | d'Arbelles |
| 6,317,047 B1 | 11/2001 | Stein et al. |
| 6,526,807 B1 | 3/2003 | Doumit et al. |
| 6,553,336 B1 | 4/2003 | Johnson et al. |
| 6,812,848 B2 | 11/2004 | Candela |
| 6,934,692 B1 | 8/2005 | Duncan |
| 6,977,585 B2 | 12/2005 | Falk et al. |
| 6,998,960 B2 | 2/2006 | Buschmann et al. |
| 7,030,767 B2 | 4/2006 | Candela |
| 7,161,483 B2 | 1/2007 | Chung |
| 7,194,416 B1 | 3/2007 | Provost et al. |
| 7,259,656 B1 | 8/2007 | Wright |
| 7,309,216 B1 | 12/2007 | Spadola et al. |
| 7,348,882 B2 | 3/2008 | Adamczyk et al. |
| 7,356,516 B2 | 4/2008 | Richey et al. |
| 7,395,219 B2 | 7/2008 | Strech |
| 7,598,856 B1 | 10/2009 | Nick et al. |
| 7,657,441 B2 | 2/2010 | Richey et al. |
| 7,683,793 B2 | 3/2010 | Li et al. |
| 7,715,036 B2 | 5/2010 | Silverbrook et al. |
| 7,809,587 B2 | 10/2010 | Dorai et al. |
| 7,813,822 B1 | 10/2010 | Hoffberg |
| 7,882,514 B2 | 2/2011 | Nielsen et al. |
| 8,010,992 B1 | 8/2011 | Chang et al. |
| 8,031,079 B2 | 10/2011 | Kates |
| 8,041,636 B1 | 10/2011 | Hunter et al. |
| 8,106,769 B1 | 1/2012 | Maroney et al. |
| 8,108,271 B1 | 1/2012 | Duncan et al. |
| 8,219,558 B1 | 7/2012 | Trandal et al. |
| 8,229,861 B1 | 7/2012 | Trandal et al. |
| 8,280,633 B1 | 10/2012 | Eldering et al. |
| 8,289,160 B1 | 10/2012 | Billman |
| 8,316,237 B1 | 11/2012 | Felsher et al. |
| 8,346,594 B2 | 1/2013 | Begeja et al. |
| 8,400,299 B1 | 3/2013 | Maroney et al. |
| 8,421,475 B2 | 4/2013 | Thiim |
| 8,490,006 B1 | 7/2013 | Reeser et al. |
| 8,510,196 B1 | 8/2013 | Brandmaier et al. |
| 8,527,306 B1 | 9/2013 | Reeser et al. |
| 8,533,144 B1 | 9/2013 | Reeser et al. |
| 8,595,034 B2 | 11/2013 | Bauer et al. |
| 8,595,790 B2 | 11/2013 | Chang et al. |
| 8,596,293 B2 | 12/2013 | Mous et al. |
| 8,605,209 B2 | 12/2013 | Becker |
| 8,620,841 B1 | 12/2013 | Filson et al. |
| 8,621,097 B2 | 12/2013 | Venkatakrishnan et al. |
| 8,640,038 B1 | 1/2014 | Reeser et al. |
| 8,650,048 B1 | 2/2014 | Hopkins et al. |
| 8,652,976 B2 | 2/2014 | Kalbe et al. |
| 8,665,084 B2 | 3/2014 | Shapiro et al. |
| 8,694,501 B1 | 4/2014 | Trandal et al. |
| 8,712,893 B1 | 4/2014 | Brandmaier et al. |
| 8,713,893 B2 | 5/2014 | Van Randen |
| 8,719,134 B1 | 5/2014 | Huls et al. |
| 8,730,039 B1 | 5/2014 | Billman |
| 8,731,975 B2 | 5/2014 | English et al. |

(56) References Cited

U.S. PATENT DOCUMENTS

| | | |
|---|---|---|
| 8,744,901 B2 | 6/2014 | Begeja et al. |
| 8,749,381 B1 | 6/2014 | Maroney et al. |
| 8,786,425 B1 | 7/2014 | Hutz |
| 8,798,289 B1 | 8/2014 | Every et al. |
| 8,890,680 B2 | 11/2014 | Reeser et al. |
| 8,917,186 B1 | 12/2014 | Grant |
| 8,976,937 B2 | 3/2015 | Shapiro et al. |
| 9,009,783 B2 | 4/2015 | Bartholomay et al. |
| 9,049,168 B2 | 6/2015 | Jacob et al. |
| 9,057,746 B1 | 6/2015 | Houlette et al. |
| 9,076,111 B2 | 7/2015 | Delorme et al. |
| 9,107,034 B2 | 8/2015 | Pham et al. |
| 9,117,318 B2 | 8/2015 | Ricci |
| 9,117,349 B2 | 8/2015 | Shapiro et al. |
| 9,142,119 B1 | 9/2015 | Grant |
| 9,152,737 B1 | 10/2015 | Micali et al. |
| 9,183,578 B1 | 11/2015 | Reeser et al. |
| 9,202,363 B1 | 12/2015 | Grant |
| 9,244,116 B2 | 1/2016 | Kabler et al. |
| 9,257,023 B2 | 2/2016 | Lee et al. |
| 9,262,909 B1 | 2/2016 | Grant |
| 9,280,252 B1 | 3/2016 | Brandmaier et al. |
| 9,286,772 B2 | 3/2016 | Shapiro et al. |
| 9,297,150 B2 | 3/2016 | Klicpera |
| 9,344,330 B2 | 5/2016 | Jacob et al. |
| 9,368,009 B2 | 6/2016 | Lee et al. |
| 9,424,606 B2 | 8/2016 | Wilson et al. |
| 9,424,737 B2 | 8/2016 | Bailey et al. |
| 9,429,925 B2 | 8/2016 | Wait |
| 9,443,195 B2 | 9/2016 | Micali et al. |
| 9,472,092 B1 | 10/2016 | Grant |
| 9,516,141 B2 | 12/2016 | Dubois et al. |
| 9,589,441 B2 | 3/2017 | Shapiro et al. |
| 9,609,003 B1 | 3/2017 | Chmielewski et al. |
| 9,613,523 B2 | 4/2017 | Davidson et al. |
| 9,652,976 B2 | 5/2017 | Bruck et al. |
| 9,654,434 B2 | 5/2017 | Sone et al. |
| 9,665,892 B1 | 5/2017 | Reeser et al. |
| 9,666,060 B2 | 5/2017 | Reeser et al. |
| 9,683,856 B2 | 6/2017 | Iyer et al. |
| 9,685,053 B2 | 6/2017 | Palmeri |
| 9,699,529 B1 | 7/2017 | Petri et al. |
| 9,710,858 B1 | 7/2017 | Devereaux et al. |
| 9,712,576 B1 | 7/2017 | Gill |
| 9,721,399 B2 | 8/2017 | Ishikawa |
| 9,727,921 B2 | 8/2017 | Cook et al. |
| 9,739,813 B2 | 8/2017 | Houlette et al. |
| 9,749,381 B1 | 8/2017 | Newton et al. |
| 9,786,158 B2 | 10/2017 | Beaver et al. |
| 9,798,979 B2 | 10/2017 | Fadell et al. |
| 9,798,993 B2 | 10/2017 | Payne et al. |
| 9,800,570 B1 | 10/2017 | Bleisch |
| 9,800,958 B1 | 10/2017 | Petri et al. |
| 9,811,862 B1 | 11/2017 | Allen et al. |
| 9,812,001 B1 | 11/2017 | Grant |
| 9,823,283 B2 | 11/2017 | Kabler et al. |
| 9,824,397 B1 | 11/2017 | Patel et al. |
| 9,857,414 B1 | 1/2018 | Kabler et al. |
| 9,882,985 B1 | 1/2018 | Esam et al. |
| 9,888,371 B1 | 2/2018 | Jacob |
| 9,892,463 B1 | 2/2018 | Hakimi et al. |
| 9,898,168 B2 | 2/2018 | Shapiro et al. |
| 9,898,912 B1 | 2/2018 | Jordan et al. |
| 9,911,042 B1 | 3/2018 | Cardona et al. |
| 9,923,971 B2 | 3/2018 | Madey et al. |
| 9,942,630 B1 | 4/2018 | Petri et al. |
| 9,947,051 B1 | 4/2018 | Allen et al. |
| 9,947,202 B1 | 4/2018 | Moon et al. |
| 9,978,033 B1 | 5/2018 | Payne et al. |
| 9,997,056 B2 | 6/2018 | Bleisch |
| 10,002,295 B1 | 6/2018 | Cardona et al. |
| 10,005,793 B2 | 6/2018 | Mazitschek et al. |
| 10,042,341 B1 | 8/2018 | Jacob |
| 10,047,974 B1 | 8/2018 | Riblet et al. |
| 10,055,793 B1 | 8/2018 | Call et al. |
| 10,055,803 B2 | 8/2018 | Orduna et al. |
| 10,057,664 B1 | 8/2018 | Moon et al. |
| 10,062,118 B1 | 8/2018 | Bernstein et al. |
| 10,073,929 B2 | 9/2018 | Vaynriber et al. |
| 10,102,584 B1 | 10/2018 | Devereaux et al. |
| 10,102,585 B1 | 10/2018 | Bryant et al. |
| 10,107,708 B1 | 10/2018 | Schick et al. |
| 10,142,394 B2 | 11/2018 | Chmielewski et al. |
| 10,169,771 B1 | 1/2019 | Devereaux et al. |
| 10,176,705 B1 | 1/2019 | Grant |
| 10,181,160 B1 | 1/2019 | Hakimi-Boushehri et al. |
| 10,186,134 B1 | 1/2019 | Moon et al. |
| 10,198,771 B1 | 2/2019 | Madigan et al. |
| 10,217,068 B1 | 2/2019 | Davis et al. |
| 10,223,750 B1 | 3/2019 | Loo et al. |
| 10,229,394 B1 | 3/2019 | Davis et al. |
| 10,244,294 B1 | 3/2019 | Moon et al. |
| 10,249,158 B1 | 4/2019 | Jordan et al. |
| 10,255,491 B2 | 4/2019 | Sekiguchi et al. |
| 10,269,074 B1 | 4/2019 | Patel et al. |
| 10,282,787 B1 | 5/2019 | Hakimi-Boushehri et al. |
| 10,282,788 B1 | 5/2019 | Jordan et al. |
| 10,282,961 B1 | 5/2019 | Jordan et al. |
| 10,295,431 B1 | 5/2019 | Schick et al. |
| 10,296,978 B1 | 5/2019 | Corder et al. |
| 10,297,138 B2 | 5/2019 | Reeser et al. |
| 10,304,313 B1 | 5/2019 | Moon et al. |
| 10,311,302 B2 | 6/2019 | Kottenstette et al. |
| 10,323,860 B1 | 6/2019 | Riblet et al. |
| 10,325,473 B1 | 6/2019 | Moon et al. |
| 10,332,059 B2 | 6/2019 | Matsuoka et al. |
| 10,346,811 B1 | 7/2019 | Jordan et al. |
| 10,353,359 B1 | 7/2019 | Jordan et al. |
| 10,356,303 B1 | 7/2019 | Jordan et al. |
| 10,366,288 B1 | 7/2019 | Kottenstette et al. |
| 10,373,256 B1 | 8/2019 | Allen et al. |
| 10,380,692 B1 | 8/2019 | Parker et al. |
| 10,387,966 B1 | 8/2019 | Shah et al. |
| 10,388,135 B1 | 8/2019 | Jordan et al. |
| 10,412,169 B1 | 9/2019 | Madey et al. |
| 10,430,887 B1 | 10/2019 | Parker et al. |
| 10,446,000 B2 | 10/2019 | Friar et al. |
| 10,467,476 B1 | 11/2019 | Cardona et al. |
| 10,467,701 B1 | 11/2019 | Corder et al. |
| 10,469,282 B1 | 11/2019 | Konrardy et al. |
| 10,480,825 B1 | 11/2019 | Riblet et al. |
| 10,482,746 B1 | 11/2019 | Moon et al. |
| 10,506,411 B1 | 12/2019 | Jacob |
| 10,514,669 B1 | 12/2019 | Call et al. |
| 10,515,372 B1 | 12/2019 | Jordan et al. |
| 10,522,009 B1 | 12/2019 | Jordan et al. |
| 10,546,478 B1 | 1/2020 | Moon et al. |
| 10,547,918 B1 | 1/2020 | Moon et al. |
| 10,552,911 B1 | 2/2020 | Allen et al. |
| 10,565,541 B2 | 2/2020 | Payne et al. |
| 10,573,146 B1 | 2/2020 | Jordan et al. |
| 10,573,149 B1 | 2/2020 | Jordan et al. |
| 10,579,028 B1 | 3/2020 | Jacob |
| 10,586,177 B1 | 3/2020 | Choueiter et al. |
| 10,607,295 B1 | 3/2020 | Hakimi-Boushehri et al. |
| 10,634,576 B1 | 4/2020 | Schick et al. |
| 10,643,072 B2 | 5/2020 | Kottenstette et al. |
| 10,664,922 B1 | 5/2020 | Madigan et al. |
| 10,679,292 B1 | 6/2020 | Call et al. |
| 10,685,402 B1 | 6/2020 | Bryant et al. |
| 10,699,346 B1 | 6/2020 | Corder et al. |
| 10,699,348 B1 | 6/2020 | Devereaux et al. |
| 10,726,494 B1 | 7/2020 | Shah et al. |
| 10,726,500 B1 | 7/2020 | Shah et al. |
| 10,733,671 B1 | 8/2020 | Hakimi-Boushehri et al. |
| 10,733,868 B2 | 8/2020 | Moon et al. |
| 10,735,829 B2 | 8/2020 | Petri et al. |
| 10,740,691 B2 | 8/2020 | Choueiter et al. |
| 10,741,033 B1 | 8/2020 | Jordan, II et al. |
| 10,750,252 B2 | 8/2020 | Petri et al. |
| 10,795,329 B1 | 10/2020 | Jordan et al. |
| 10,796,557 B2 | 10/2020 | Sundermeyer et al. |
| 10,802,477 B1 | 10/2020 | Konrardy et al. |
| 10,804,700 B2 | 10/2020 | Cohen et al. |

(56) References Cited

U.S. PATENT DOCUMENTS

| | | |
|---|---|---|
| 10,818,105 B1 | 10/2020 | Konrardy et al. |
| 10,823,458 B1 | 11/2020 | Riblet et al. |
| 10,824,971 B1 | 11/2020 | Davis et al. |
| 10,825,320 B1 | 11/2020 | Moon et al. |
| 10,825,321 B2 | 11/2020 | Moon et al. |
| 10,832,225 B1 | 11/2020 | Davis et al. |
| 10,846,800 B1 | 11/2020 | Bryant et al. |
| 10,907,844 B2 | 2/2021 | Ribbich et al. |
| 10,922,756 B1 | 2/2021 | Call et al. |
| 10,922,948 B1 | 2/2021 | Moon et al. |
| 10,943,447 B1 | 3/2021 | Jordan et al. |
| 10,970,990 B1 | 4/2021 | Jacob |
| 10,990,069 B1 | 4/2021 | Jacob |
| 11,003,334 B1 | 5/2021 | Conway et al. |
| 11,004,320 B1 | 5/2021 | Jordan et al. |
| 11,015,997 B1 | 5/2021 | Schick et al. |
| 11,017,480 B2 | 5/2021 | Shah et al. |
| 11,042,131 B2 | 6/2021 | Strohmenger et al. |
| 11,042,137 B1 | 6/2021 | Call et al. |
| 11,042,942 B1 | 6/2021 | Hakimi-Boushehri et al. |
| 11,043,098 B1 | 6/2021 | Jordan et al. |
| 11,049,078 B1 | 6/2021 | Jordan et al. |
| 11,049,189 B2 | 6/2021 | Shah et al. |
| 11,074,659 B1 | 7/2021 | Hakimi-Boushehri et al. |
| 11,100,594 B1 | 8/2021 | West et al. |
| 11,118,812 B1 | 9/2021 | Riblet et al. |
| 11,126,708 B2 | 9/2021 | Reimer |
| 11,151,378 B2 | 10/2021 | Kottenstette et al. |
| 11,164,257 B1 | 11/2021 | Devereaux et al. |
| 11,210,552 B2 | 12/2021 | Kossyk et al. |
| 11,222,426 B2 | 1/2022 | Richter et al. |
| 11,232,150 B2 | 1/2022 | Vianello et al. |
| 11,232,873 B1 | 1/2022 | Aspro et al. |
| 11,277,465 B2 | 3/2022 | Chmielewski et al. |
| 11,348,193 B1 | 5/2022 | Konrardy et al. |
| 11,367,265 B2 | 6/2022 | Vianello et al. |
| 11,417,212 B1 | 8/2022 | Farooqui et al. |
| 11,562,434 B2 | 1/2023 | Wedig et al. |
| 2001/0025349 A1 | 9/2001 | Sharood et al. |
| 2002/0040306 A1 | 4/2002 | Sugiyama et al. |
| 2002/0147006 A1 | 10/2002 | Coon et al. |
| 2002/0184643 A1 | 12/2002 | Fichet |
| 2003/0025599 A1 | 2/2003 | Monroe |
| 2003/0048191 A1 | 3/2003 | Denton |
| 2003/0144793 A1 | 7/2003 | Melaku et al. |
| 2003/0192600 A1 | 10/2003 | Ford |
| 2003/0234725 A1 | 12/2003 | Lemelson et al. |
| 2004/0054789 A1 | 3/2004 | Breh et al. |
| 2004/0153346 A1 | 8/2004 | Grundel et al. |
| 2004/0153382 A1 | 8/2004 | Boccuzzi et al. |
| 2004/0177032 A1 | 9/2004 | Bradley et al. |
| 2004/0185844 A1 | 9/2004 | Neuman |
| 2004/0211228 A1 | 10/2004 | Nishio et al. |
| 2004/0214566 A1 | 10/2004 | Suzuki et al. |
| 2005/0030175 A1 | 2/2005 | Wolfe |
| 2005/0080520 A1 | 4/2005 | Kline et al. |
| 2005/0111696 A1 | 5/2005 | Baer |
| 2005/0139420 A1 | 6/2005 | Spoltore et al. |
| 2005/0143956 A1 | 6/2005 | Long et al. |
| 2005/0241003 A1 | 10/2005 | Sweeney et al. |
| 2005/0251427 A1 | 11/2005 | Dorai et al. |
| 2005/0275527 A1 | 12/2005 | Kates |
| 2006/0033625 A1 | 2/2006 | Johnson et al. |
| 2006/0058612 A1 | 3/2006 | Dave et al. |
| 2006/0100912 A1 | 5/2006 | Kumar et al. |
| 2006/0154642 A1 | 7/2006 | Scannell, Jr. |
| 2006/0158339 A1 | 7/2006 | Brundula |
| 2006/0184379 A1 | 8/2006 | Tan et al. |
| 2007/0001904 A1 | 1/2007 | Mendelson |
| 2007/0096938 A1 | 5/2007 | Lopez et al. |
| 2007/0146150 A1 | 6/2007 | Calabrese et al. |
| 2007/0262857 A1 | 11/2007 | Jackson |
| 2007/0276626 A1 | 11/2007 | Bruffey |
| 2007/0289635 A1 | 12/2007 | Ghazarian et al. |
| 2008/0018474 A1 | 1/2008 | Bergman et al. |
| 2008/0019392 A1 | 1/2008 | Lee |
| 2008/0056722 A1 | 3/2008 | Hendrix et al. |
| 2008/0059351 A1 | 3/2008 | Richey et al. |
| 2008/0065427 A1 | 3/2008 | Helitzer et al. |
| 2008/0101160 A1 | 5/2008 | Besson |
| 2008/0157984 A1 | 7/2008 | Li et al. |
| 2008/0184272 A1 | 7/2008 | Brownewell |
| 2008/0231468 A1 | 9/2008 | Myllymaki |
| 2008/0235629 A1 | 9/2008 | Porter et al. |
| 2008/0285797 A1 | 11/2008 | Hammadou |
| 2008/0301216 A1 | 12/2008 | Han |
| 2009/0001891 A1 | 1/2009 | Patterson |
| 2009/0024420 A1 | 1/2009 | Winkler |
| 2009/0044595 A1 | 2/2009 | Vokey |
| 2009/0094129 A1 | 4/2009 | Rhodes et al. |
| 2009/0174364 A1 | 7/2009 | Onishi et al. |
| 2009/0195349 A1 | 8/2009 | Frader-Thompson et al. |
| 2009/0206059 A1 | 8/2009 | Kiko |
| 2009/0243852 A1 | 10/2009 | Haupt et al. |
| 2009/0259581 A1 | 10/2009 | Horowitz et al. |
| 2009/0265193 A1 | 10/2009 | Collins et al. |
| 2010/0025349 A1 | 2/2010 | Khoshnevis |
| 2010/0073840 A1 | 3/2010 | Hennessey, Jr. |
| 2010/0131416 A1 | 5/2010 | Means |
| 2010/0188023 A1 | 7/2010 | Anderson et al. |
| 2010/0188206 A1 | 7/2010 | Kates |
| 2010/0235285 A1 | 9/2010 | Hoffberg |
| 2010/0241465 A1 | 9/2010 | Amigo et al. |
| 2010/0289643 A1 | 11/2010 | Trundle et al. |
| 2010/0299217 A1 | 11/2010 | Hui |
| 2011/0003577 A1 | 1/2011 | Rogalski et al. |
| 2011/0029145 A1 | 2/2011 | Dong |
| 2011/0040785 A1 | 2/2011 | Steenberg et al. |
| 2011/0077875 A1 | 3/2011 | Tran et al. |
| 2011/0112660 A1 | 5/2011 | Bergmann et al. |
| 2011/0136463 A1 | 6/2011 | Ebdon et al. |
| 2011/0161117 A1 | 6/2011 | Busque et al. |
| 2011/0161119 A1 | 6/2011 | Collins |
| 2011/0166714 A1 | 7/2011 | Stachnik |
| 2011/0195687 A1 | 8/2011 | Das et al. |
| 2011/0203383 A1 | 8/2011 | Phelps |
| 2011/0251807 A1 | 10/2011 | Rada et al. |
| 2011/0270453 A1 | 11/2011 | Kalogridis et al. |
| 2012/0016695 A1 | 1/2012 | Bernard et al. |
| 2012/0046973 A1 | 2/2012 | Eshleman et al. |
| 2012/0054124 A1 | 3/2012 | Rodrigues |
| 2012/0079092 A1 | 3/2012 | Woxblom et al. |
| 2012/0101855 A1 | 4/2012 | Collins et al. |
| 2012/0116071 A1 | 5/2012 | Rao et al. |
| 2012/0116820 A1 | 5/2012 | English et al. |
| 2012/0131217 A1 | 5/2012 | Delorme et al. |
| 2012/0166115 A1 | 6/2012 | Apostolakis |
| 2012/0188081 A1 | 7/2012 | Van Katwijk |
| 2012/0191498 A1 | 7/2012 | Singh et al. |
| 2012/0204490 A1 | 8/2012 | Lanigan et al. |
| 2012/0232935 A1 | 9/2012 | Voccola |
| 2012/0249121 A1 | 10/2012 | Pamulaparthy et al. |
| 2012/0265586 A1 | 10/2012 | Mammone |
| 2012/0290333 A1 | 11/2012 | Birchall |
| 2012/0290497 A1 | 11/2012 | Magara et al. |
| 2012/0296580 A1 | 11/2012 | Barkay |
| 2012/0311620 A1 | 12/2012 | Conklin et al. |
| 2013/0022234 A1 | 1/2013 | U S et al. |
| 2013/0049950 A1 | 2/2013 | Wohlert |
| 2013/0073321 A1 | 3/2013 | Hofmann et al. |
| 2013/0083193 A1 | 4/2013 | Okuyama et al. |
| 2013/0085688 A1 | 4/2013 | Miller et al. |
| 2013/0096954 A1 | 4/2013 | Bodas |
| 2013/0096960 A1 | 4/2013 | English et al. |
| 2013/0100268 A1 | 4/2013 | Mihailidis et al. |
| 2013/0107706 A1 | 5/2013 | Raleigh |
| 2013/0120137 A1 | 5/2013 | Lehmann |
| 2013/0144486 A1 | 6/2013 | Ricci |
| 2013/0145693 A1 | 6/2013 | Li |
| 2013/0159021 A1 | 6/2013 | Felsher |
| 2013/0166325 A1 | 6/2013 | Ganapathy et al. |
| 2013/0169817 A1 | 7/2013 | Jones et al. |
| 2013/0226624 A1 | 8/2013 | Blessman et al. |
| 2013/0234840 A1 | 9/2013 | Trundle et al. |

(56) References Cited

U.S. PATENT DOCUMENTS

| | | |
|---|---|---|
| 2013/0242074 A1 | 9/2013 | Sekiguchi et al. |
| 2013/0257626 A1 | 10/2013 | Masli et al. |
| 2013/0263611 A1 | 10/2013 | Kearney et al. |
| 2013/0290013 A1 | 10/2013 | Forrester |
| 2013/0290033 A1 | 10/2013 | Reeser et al. |
| 2013/0317861 A1 | 11/2013 | Tofte et al. |
| 2014/0032433 A1 | 1/2014 | Eick et al. |
| 2014/0118140 A1 | 5/2014 | Amis |
| 2014/0122133 A1 | 5/2014 | Weisberg et al. |
| 2014/0136242 A1 | 5/2014 | Weekes et al. |
| 2014/0142989 A1 | 5/2014 | Grosso |
| 2014/0148733 A1 | 5/2014 | Stone et al. |
| 2014/0149127 A1 | 5/2014 | Storti |
| 2014/0172723 A1 | 6/2014 | Borisov et al. |
| 2014/0180723 A1 | 6/2014 | Cote et al. |
| 2014/0201315 A1 | 7/2014 | Jacob et al. |
| 2014/0201844 A1 | 7/2014 | Buck |
| 2014/0216071 A1 | 8/2014 | Broadbent |
| 2014/0222298 A1 | 8/2014 | Gurin |
| 2014/0222329 A1 | 8/2014 | Frey |
| 2014/0222469 A1 | 8/2014 | Stahl et al. |
| 2014/0229205 A1 | 8/2014 | Gibson |
| 2014/0238511 A1 | 8/2014 | Klicpera |
| 2014/0244997 A1 | 8/2014 | Goel et al. |
| 2014/0257851 A1 | 9/2014 | Walker et al. |
| 2014/0257862 A1 | 9/2014 | Billman et al. |
| 2014/0257871 A1 | 9/2014 | Christensen et al. |
| 2014/0257876 A1 | 9/2014 | English et al. |
| 2014/0266669 A1 | 9/2014 | Fadell et al. |
| 2014/0266717 A1 | 9/2014 | Warren et al. |
| 2014/0277625 A1 | 9/2014 | Gettings et al. |
| 2014/0278571 A1 | 9/2014 | Mullen et al. |
| 2014/0303801 A1 | 10/2014 | Ahn et al. |
| 2014/0306799 A1 | 10/2014 | Ricci |
| 2014/0306806 A1 | 10/2014 | Martinez et al. |
| 2014/0310162 A1 | 10/2014 | Collins |
| 2014/0313044 A1 | 10/2014 | Thompson et al. |
| 2014/0317741 A1 | 10/2014 | Be et al. |
| 2014/0318200 A1 | 10/2014 | Ellis et al. |
| 2014/0320295 A1 | 10/2014 | Kates |
| 2014/0340216 A1 | 11/2014 | Puskarich |
| 2014/0358592 A1 | 12/2014 | Wedig et al. |
| 2014/0359552 A1 | 12/2014 | Misra et al. |
| 2014/0379156 A1 | 12/2014 | Kamel et al. |
| 2015/0020299 A1 | 1/2015 | Hsu |
| 2015/0025915 A1 | 1/2015 | Lekas |
| 2015/0032480 A1 | 1/2015 | Blackhurst et al. |
| 2015/0061859 A1 | 3/2015 | Matsuoka et al. |
| 2015/0116107 A1 | 4/2015 | Fadell et al. |
| 2015/0116112 A1 | 4/2015 | Flinsenberg et al. |
| 2015/0124087 A1 | 5/2015 | Jones et al. |
| 2015/0135596 A1 | 5/2015 | Cooper |
| 2015/0154712 A1 | 6/2015 | Cook |
| 2015/0156031 A1 | 6/2015 | Fadell et al. |
| 2015/0160623 A1 | 6/2015 | Holley |
| 2015/0160636 A1 | 6/2015 | Mccarthy et al. |
| 2015/0163412 A1 | 6/2015 | Holley et al. |
| 2015/0168976 A1 | 6/2015 | Loucks et al. |
| 2015/0170288 A1 | 6/2015 | Harton et al. |
| 2015/0206249 A1 | 7/2015 | Fini |
| 2015/0254940 A1 | 9/2015 | Graef et al. |
| 2015/0287310 A1 | 10/2015 | Deiiuliis et al. |
| 2015/0305690 A1 | 10/2015 | Tan et al. |
| 2015/0332407 A1 | 11/2015 | Wilson et al. |
| 2015/0347910 A1 | 12/2015 | Fadell et al. |
| 2015/0364028 A1 | 12/2015 | Child et al. |
| 2016/0005130 A1 | 1/2016 | Devereaux et al. |
| 2016/0006723 A1 | 1/2016 | Wilson |
| 2016/0018226 A1 | 1/2016 | Plocher et al. |
| 2016/0042463 A1 | 2/2016 | Gillespie |
| 2016/0078744 A1 | 3/2016 | Gieck |
| 2016/0104250 A1 | 4/2016 | Allen et al. |
| 2016/0119424 A1 | 4/2016 | Kane et al. |
| 2016/0161940 A1 | 6/2016 | Max |
| 2016/0163186 A1 | 6/2016 | Davidson et al. |
| 2016/0188829 A1 | 6/2016 | Southerland et al. |
| 2016/0225562 A1 | 8/2016 | Franks et al. |
| 2016/0259902 A1 | 9/2016 | Feldman et al. |
| 2016/0269882 A1 | 9/2016 | Balthasar et al. |
| 2016/0269883 A1 | 9/2016 | Eswaran |
| 2016/0274154 A1 | 9/2016 | Kabler et al. |
| 2016/0292321 A1 | 10/2016 | Wall |
| 2016/0323771 A1 | 11/2016 | Raleigh |
| 2016/0337829 A1 | 11/2016 | Fletcher et al. |
| 2016/0342767 A1 | 11/2016 | Narasimhan et al. |
| 2016/0343084 A1 | 11/2016 | Blessman et al. |
| 2016/0360965 A1 | 12/2016 | Tran |
| 2016/0371620 A1 | 12/2016 | Nascenzi et al. |
| 2017/0116676 A1 | 4/2017 | Blessman et al. |
| 2017/0147722 A1 | 5/2017 | Greenwood |
| 2017/0172465 A1 | 6/2017 | Osorio |
| 2017/0228109 A1 | 8/2017 | Zhang et al. |
| 2017/0304659 A1 | 10/2017 | Chen et al. |
| 2018/0000346 A1 | 1/2018 | Cronin |
| 2018/0146042 A1 | 5/2018 | Choi |
| 2018/0160988 A1 | 6/2018 | Miller et al. |
| 2019/0251520 A1 | 8/2019 | Bentley, III et al. |
| 2019/0363746 A1 | 11/2019 | Zalewski et al. |
| 2020/0302549 A1 | 9/2020 | Jordan et al. |
| 2020/0327791 A1 | 10/2020 | Moon et al. |
| 2021/0035432 A1 | 2/2021 | Moon et al. |
| 2021/0042843 A1 | 2/2021 | Bryant et al. |
| 2021/0158671 A1 | 5/2021 | Jordan et al. |
| 2021/0248884 A1 | 8/2021 | Dougan |
| 2021/0279811 A1 | 9/2021 | Waltman et al. |
| 2021/0312789 A1 | 10/2021 | Linn |
| 2022/0101275 A1 | 3/2022 | Aspro et al. |

FOREIGN PATENT DOCUMENTS

| | | |
|---|---|---|
| CN | 113138558 A | 7/2021 |
| JP | 2003-157357 A | 5/2003 |
| KR | 10-2015-0129845 A | 11/2015 |
| WO | 2008/155545 A2 | 12/2008 |
| WO | 2013/076721 A1 | 5/2013 |
| WO | 2014/159131 A2 | 10/2014 |
| WO | 2014/207558 A2 | 12/2014 |
| WO | 2016/081511 A2 | 5/2016 |
| WO | 2021/087185 A1 | 5/2021 |

OTHER PUBLICATIONS

U.S. Appl. No. 14/873,722, Nonfinal Office Action, dated Dec. 5, 2017.

U.S. Appl. No. 14/873,726, Nonfinal Office Action, dated Sep. 28, 2018.

U.S. Appl. No. 14/873,771, Nonfinal Office Action, dated Aug. 28, 2018.

U.S. Appl. No. 14/873,771, Notice of Allowance, dated Mar. 14, 2019.

U.S. Appl. No. 14/873,783, Final Office Action, dated May 23, 2018.

U.S. Appl. No. 14/873,783, Nonfinal Office Action, dated Dec. 8, 2017.

U.S. Appl. No. 14/873,783, Nonfinal Office Action, dated Oct. 19, 2018.

U.S. Appl. No. 14/873,783, Notice of Allowance, dated Mar. 21, 2019.

U.S. Appl. No. 14/873,817, Nonfinal Office Action, dated Oct. 17, 2018.

U.S. Appl. No. 14/873,823, Final Office Action, dated Jun. 29, 2018.
U.S. Appl. No. 14/873,823, Final Office Action, dated Mar. 15, 2017.
U.S. Appl. No. 14/873,823, Final Office Action, dated Nov. 3, 2017.
U.S. Appl. No. 14/873,823, Nonfinal Office Action, dated Feb. 23, 2018.
U.S. Appl. No. 14/873,823, Nonfinal Office Action, dated Jun. 21, 2017.
U.S. Appl. No. 14/873,823, Nonfinal Office Action, dated Oct. 4, 2018.

(56) References Cited

OTHER PUBLICATIONS

U.S. Appl. No. 14/873,823, Nonfinal Office Action, dated Nov. 30, 2016.
U.S. Appl. No. 14/873,823, Notice of Allowance, dated Apr. 24, 2019.
U.S. Appl. No. 14/873,864, Corrected Notice of Allowability, dated Jan. 18, 2018.
U.S. Appl. No. 14/873,864, Final Office Action, dated Dec. 2, 2016.
U.S. Appl. No. 14/873,864, Nonfinal Office Action, dated Apr. 5, 2017.
U.S. Appl. No. 14/873,864, Nonfinal Office Action, dated Jul. 14, 2016.
U.S. Appl. No. 14/873,864, Notice of Allowance, dated Dec. 21, 2017.
U.S. Appl. No. 14/873,865, Nonfinal Office Action, dated Oct. 5, 2018.
U.S. Appl. No. 14/873,904, Nonfinal Office Action, dated Sep. 10, 2018.
U.S. Appl. No. 14/873,914, Final Office Action, dated Jul. 10, 2018.
U.S. Appl. No. 14/873,914, Nonfinal Office Action, dated Dec. 26, 2017.
U.S. Appl. No. 14/873,914, Nonfinal Office Action, dated Nov. 2, 2018.
U.S. Appl. No. 14/873,914, Notice of Allowance, dated Mar. 20, 2019.
U.S. Appl. No. 14/873,942, Nonfinal Office Action, dated Jul. 6, 2018.
U.S. Appl. No. 14/873,942, Nonfinal Office Action, dated Mar. 16, 2018.
U.S. Appl. No. 14/873,942, Nonfinal Office Action, dated Nov. 22, 2017.
U.S. Appl. No. 14/873,942, Notice of Allowance, dated Dec. 20, 2018.
U.S. Appl. No. 14/873,942, Notice of Allowance, dated Jan. 17, 2019.
U.S. Appl. No. 14/873,968, Nonfinal Office Action, dated Aug. 10, 2018.
U.S. Appl. No. 15/087,326, Final Office Action, dated Dec. 27, 2018.
U.S. Appl. No. 15/087,326, Final Office Action, dated Sep. 16, 2019.
U.S. Appl. No. 15/087,326, Nonfinal Office Action, dated Mar. 19, 2019.
U.S. Appl. No. 15/087,326, Nonfinal Office Action, dated Jun. 14, 2018.
U.S. Appl. No. 15/409,248, filed Jan. 18, 2017, Konrardy et al., "Sensor Malfunction Detection".
U.S. Appl. No. 15/409,271, filed Jan. 18, 2017, Konrardy et al., "Autonomous Vehicle Component Malfunction Impact Assessment".
U.S. Appl. No. 15/409,336, filed Jan. 18, 2017, Konrardy et al., "Automatic Repair of Autonomous Components".
U.S. Appl. No. 15/409,340, filed Jan. 18, 2017, Konrardy et al., "Autonomous Vehicle Damage and Salvage Assessment".
U.S. Appl. No. 15/409,359, filed Jan. 18, 2017, Konrardy et al., "Detecting and Responding to Autonomous Vehicle Collisions".
U.S. Appl. No. 15/409,371, filed Jan. 18, 2017, Konrardy et al., "Detecting and Responding to Autonomous Environment Incidents".
U.S. Appl. No. 15/409,473, filed Jan. 18, 2017, Konrardy et al., "Virtual Testing of Autonomous Environment Control System".
U.S. Appl. No. 15/859,859, filed Jan. 2, 2018, Hakmi-Boushehri et al., "Systems and Methods for Community-Based Cause of Loss Determination".
U.S. Appl. No. 15/859,859, Nonfinal Office Action, dated Aug. 21, 2019.
U.S. Appl. No. 15/895,149, Nonfinal Office Action, dated Sep. 18, 2018.
U.S. Appl. No. 16/266,423, filed Feb. 4, 2019, Jordan et al., "Systems and Methods for Automatically Responding to Fire".
U.S. Appl. No. 16/266,423, Notice of Allowance, dated Oct. 15, 2019.
U.S. Appl. No. 16/282,789, Notice of Allowance, dated Nov. 6, 2019.
U.S. Appl. No. 16/393,336, filed Apr. 24, 2019, Jordan et al., "Systems and Methods for Controlling Smart Devices Based Upon Image Data from Image Sensors".
U.S. Appl. No. 16/445,399, filed Jun. 19, 2019, Jordan et al., "Systems and Methods for Analyzing Sensor Data to Detect Property Intrusion Events".
U.S. Appl. No. 14/873,864, Notice of Allowance, dated Aug. 28, 2017.
Anonymous, Systems and methods for insurers to monitor continuously structural status of insured homes, IP.COM Prior Art Database, Disclosure No. IPCOM000177511D, published Dec. 16, 2008, (2008).
Knutsen et al., Confusion About Causation in Insurance: Solutions for Catastrophic Losses, Ala. L. Rev., 5:957-1023 (2010).
Romero, Monsoon Mess?? Whom do you call?, Arizona Republic, Phoenix Arizona, May 26, 2012.
System for Loss Prevention, authors anonymous, retrieved May 18, 2018 from https://priorart.ip.com/IPCOM/000176198, Electronic Publication Date: Nov. 8, 2008 (2008).
System for Loss Prevention, IP.com, published Nov. 8, 2008.
U.S. Appl. No. 14/692,943, Nonfinal Office Action, dated Sep. 12, 2017.
U.S. Appl. No. 14/692,946, Final Office Action, dated Oct. 30, 2017.
U.S. Appl. No. 14/692,946, Nonfinal Office Action, dated Apr. 4, 2017.
U.S. Appl. No. 14/692,961, Final Office Action, dated Jun. 20, 2018.
U.S. Appl. No. 14/692,961, Nonfinal Office Action, dated Apr. 14, 2017.
U.S. Appl. No. 14/692,961, Nonfinal Office Action, dated Dec. 28, 2017.
U.S. Appl. No. 14/693,034, Notice of Allowance, dated Oct. 25, 2017.
U.S. Appl. No. 14/693,057, Nonfinal Office Action, dated Aug. 21, 2017.
U.S. Patent Application filed Feb. 13, 2018, Jordan et al., Systems and Methods for Automatically Generating an Escape Route,, U.S. Appl. No. 15/895,149.
U.S. Patent Application filed Jan. 18, 2017, Konrardy et al., "Automatic Repair of Autonomous Vehicles",, U.S. Appl. No. 15/409,318.
U.S. Patent Application filed Jan. 18, 2017, Konrardy et al., "Component Damage and Salvage Assessment",, U.S. Appl. No. 15/409,349.
U.S. Patent Application filed Jan. 18, 2017, Konrardy et al., "Component Malfunction Impact Assessment",, U.S. Appl. No. 15/409,305.
U.S. Patent Application filed Jan. 18, 2017, Konrardy et al., "Virtual Testing of Autonomous Vehicle Control System",, U.S. Appl. No. 15/409,445.
U.S. Appl. No. 14/692,864, Final Office Action, dated Nov. 7, 2018.
U.S. Appl. No. 14/692,864, Final Office Action, dated Nov. 8, 2017.
U.S. Appl. No. 14/692,864, Nonfinal Office Action, dated May 16, 2017.
U.S. Appl. No. 14/692,864, Nonfinal Office Action, dated May 24, 2018.
U.S. Appl. No. 14/692,897, Final Office Action, dated Apr. 19, 2019.
U.S. Appl. No. 14/692,897, Nonfinal Office Action, dated Sep. 19, 2018.
U.S. Appl. No. 14/692,943, Notice of Allowance, dated May 1, 2018.
U.S. Appl. No. 14/692,946, Final Office Action, dated Sep. 25, 2018.
U.S. Appl. No. 14/692,946, Nonfinal Office Action, dated Apr. 6, 2018.
U.S. Appl. No. 14/692,946, Notice of Allowance, dated Feb. 6, 2019.
U.S. Appl. No. 14/692,953, Final Office Action, dated Apr. 27, 2018.
U.S. Appl. No. 14/692,953, Nonfinal Office Action, dated Jun. 14, 2019.
U.S. Appl. No. 14/692,953, Nonfinal Office Action, dated Sep. 19, 2017.
U.S. Appl. No. 14/692,961, Final Office Action, dated Sep. 1, 2017.

(56) References Cited

OTHER PUBLICATIONS

U.S. Appl. No. 14/692,961, Notice of Allowance, dated Aug. 28, 2019.
U.S. Appl. No. 14/693,021, Final Office Action, dated Apr. 9, 2019.
U.S. Appl. No. 14/693,021, Final Office Action, dated Jan. 25, 2018.
U.S. Appl. No. 14/693,021, Nonfinal Office Action, dated Sep. 18, 2018.
U.S. Appl. No. 14/693,021, Nonfinal Office Action, dated Jun. 30, 2017.
U.S. Appl. No. 14/693,032, Final Office Action, dated Mar. 22, 2018.
U.S. Appl. No. 14/693,032, Nonfinal Office Action, dated Sep. 7, 2017.
U.S. Appl. No. 14/693,032, Notice of Allowance, dated Jun. 22, 2018.
U.S. Appl. No. 14/693,034, Nonfinal Office Action, dated May 17, 2017.
U.S. Appl. No. 14/693,039, Final Office Action, dated Dec. 15, 2017.
U.S. Appl. No. 14/693,039, Nonfinal Office Action, dated Jun. 5, 2017.
U.S. Appl. No. 14/693,039, Nonfinal Office Action, dated May 3, 2018.
U.S. Appl. No. 14/693,039, Notice of Allowance, dated Oct. 12, 2018.
U.S. Appl. No. 14/693,057, Final Office Action, dated Jul. 8, 2019.
U.S. Appl. No. 14/693,057, Final Office Action, dated Feb. 7, 2018.
U.S. Appl. No. 14/693,057, Nonfinal Office Action, dated Feb. 14, 2019.
U.S. Appl. No. 14/873,722, Final Office Action, dated Jun. 15, 2018.

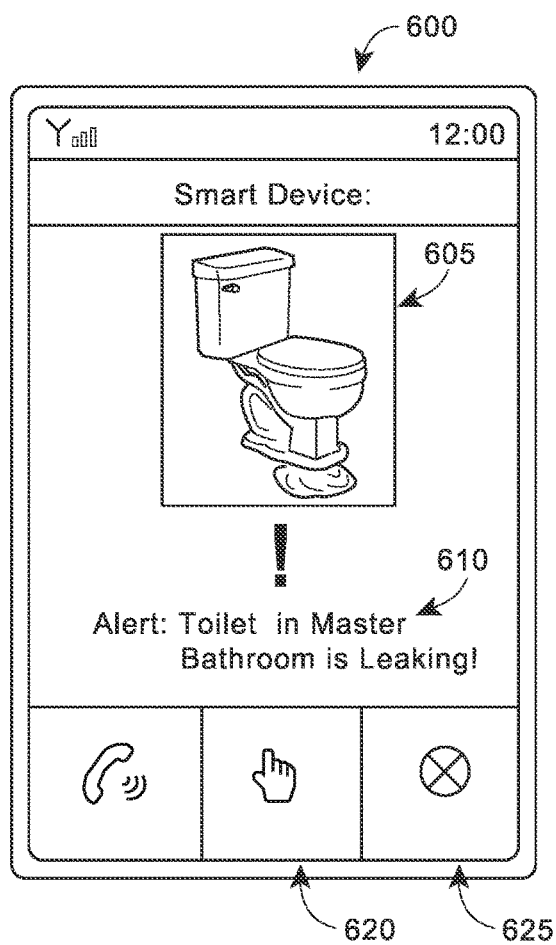
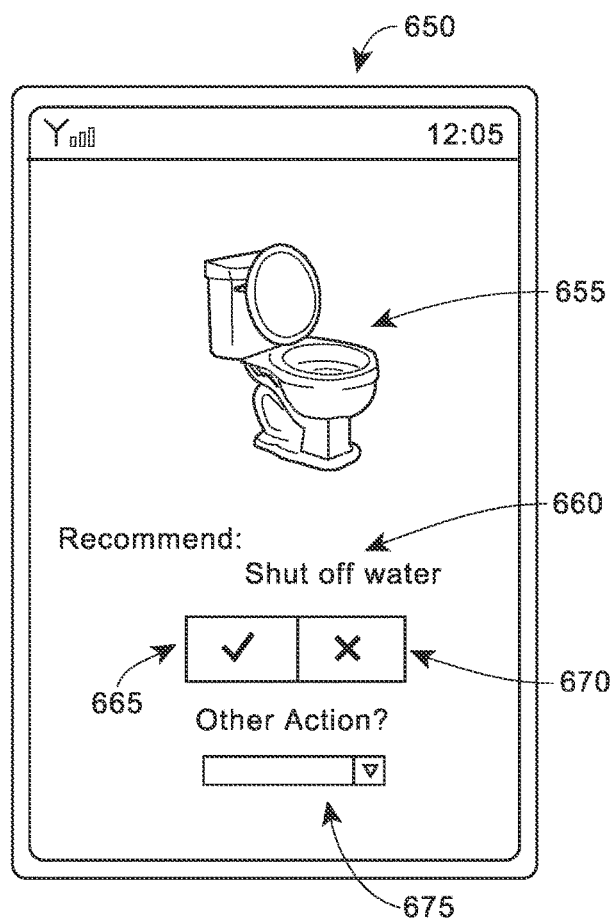
FIG. 6A  FIG. 6B

SYSTEMS AND METHODS FOR AUTOMATICALLY MITIGATING RISK OF PROPERTY DAMAGE

CROSS-REFERENCE TO RELATED APPLICATIONS

This application is a continuation of and claims the benefit of U.S. patent application Ser. No. 17/077,781, entitled "SYSTEMS AND METHODS FOR AUTOMATICALLY MITIGATING RISK OF PROPERTY DAMAGE" and filed Oct. 22, 2020, which is a continuation of U.S. patent application Ser. No. 16/038,310, entitled "SYSTEMS AND METHODS FOR AUTOMATICALLY MITIGATING RISK OF PROPERTY DAMAGE" and filed Jul. 18, 2018, which is a continuation of U.S. patent application Ser. No. 14/693,032, entitled "SYSTEMS AND METHODS FOR AUTOMATICALLY MITIGATING RISK OF PROPERTY DAMAGE" and filed Apr. 22, 2015, which claims benefit of the filing date of U.S. Provisional Patent Application No. 61/984,541 (filed Apr. 25, 2014, and entitled "HOME INSURANCE AND THE PREVENTION, DETECTION, AND MITIGATION OF HOUSEHOLD DAMAGE"); U.S. Provisional Patent Application No. 62/012,008 (filed Jun. 13, 2014, and entitled "HOME INSURANCE AND THE PREVENTION, DETECTION, AND MITIGATION OF HOUSEHOLD DAMAGE"); U.S. Provisional Patent Application No. 62/061,000 (filed Oct. 7, 2014, and entitled "SYSTEMS AND METHODS FOR AUTOMATICALLY MITIGATING RISK OF PROPERTY DAMAGE"); U.S. Provisional Patent Application No. 62/061,003 (filed Oct. 7, 2014, and entitled "SYSTEMS AND METHODS FOR HOMEOWNER-DIRECTED RISK OF PROPERTY DAMAGE MITIGATION"); U.S. Provisional Patent Application No. 62/061,018 (filed Oct. 7, 2014, and entitled "SYSTEMS AND METHODS FOR DETERMINING CAUSE OF LOSS TO A PROPERTY"); U.S. Provisional Patent Application No. 62/061,016 (filed Oct. 7, 2014, and entitled "SYSTEMS AND METHODS FOR PREDICTIVELY GENERATING AN INSURANCE CLAIM"); U.S. Provisional Patent Application No. 62/061,012 (filed Oct. 7, 2014, and entitled "SYSTEMS AND METHODS FOR ASSIGNING DAMAGE CAUSED BY AN INSURANCE-RELATED EVENT"); U.S. Provisional Patent Application No. 62/061,009 (filed Oct. 7, 2014, and entitled "SYSTEMS AND METHODS FOR COMMUNITY-BASED CAUSE OF LOSS DETERMINATION"); U.S. Provisional Patent Application No. 62/060,777 (filed Oct. 7, 2014, and entitled "SYSTEMS AND METHODS FOR MANAGING INSURANCE ASSOCIATED WITH DEVICES POPULATED WITHIN A PROPERTY"); U.S. Provisional Patent Application No. 62/061,007 (filed Oct. 7, 2014, and entitled "SYSTEMS AND METHODS FOR AUTOMATICALLY MITIGATING RISK OF WATER DAMAGE"); U.S. Provisional Patent Application No. 62/060,808 (filed Oct. 7, 2014, and entitled "SYSTEMS AND METHODS FOR MANAGING INSURANCE BASED ON DEVICE LOCATION WITHIN A PROPERTY"); U.S. Provisional Patent Application No. 62/060,847 (filed Oct. 7, 2014, and entitled "SYSTEMS AND METHODS FOR MANAGING INSURANCE FOR DEVICES LOCATED WITHIN A PROPERTY BASED ON INSURANCE-RELATED EVENTS"); and U.S. Provisional Patent Application No. 62/073,695 (filed Oct. 31, 2014, and entitled "SYSTEMS AND METHODS FOR MANAGING THE OPERATION OF DEVICES WITHIN A PROPERTY")— which are all hereby incorporated by reference in their entireties.

FIELD OF THE DISCLOSURE

The present disclosure generally relates to reducing the risk of a home experiencing an insurance-related event, more particularly, to systems and methods that leverage a plurality of smart appliances to detect and mitigate risks of insurance-related events.

BACKGROUND

Homeowner and personal property insurance exists to provide financial protection against damage to the home and personal property owner by the policyholder, respectively. There are many potential sources of damage to homes and personal property, some of which can be detected far enough in advance to take an action that may mitigate or prevent damage from occurring. Currently, many appliances and other goods are capable of communicating information about their operation via mesh networks as part of the "internet of things." However, there is no way to aggregate and analyze all of this communicated data to manage and reduce the risks associated with insurance-related events.

Thus, the present embodiments may, inter alia, detect and alleviate the foregoing risks, such as the risk of home damage, personal property damage, insurance claims, and/or other risks.

SUMMARY

In one aspect, a computer-implemented method of limiting damage to a property (such as an interconnected or smart home) may be provided. The property may be populated with a controller in communication with a plurality of devices in the property. Each of the plurality of devices may be configured to monitor various conditions associated with the property. The method may include (1) receiving, via a first wired or wireless communication network, sensor data from a first at least one of the plurality of devices. The sensor data may be indicative of at least one potential change in at least one of the various conditions associated with the property. The method may include (2) detecting, by one or more processors (such as one or more local or remote processors associated with a smart home controller and/or insurance provider, respectively), a potential insurance-related event associated with the property through analyzing the sensor data, and/or (3) determining, by the one or more processors, an appropriate or corrective action to be performed or otherwise taken by a second at least one of the plurality of devices to mitigate or prevent damage associated with the potential insurance-related event. The method may further include (4) directing, controlling, or causing, at the one or more processors (such as via wireless communication or data transmission with the devices), the corrective action to be performed by the second at least one of the plurality of devices or other device at the property. The method may include additional, fewer, or alternate actions, including those discussed elsewhere herein.

In another aspect, a system for limiting damage to a property populated with a controller in communication with a plurality of devices in the property may be provided. Each of the plurality of devices may be configured to monitor various conditions associated with the property. The system may include a communication module adapted to communicate data; a memory adapted to store non-transitory computer executable instructions; and/or one or more processors adapted to interface with the communication module. The one or more processors may be configured to execute the non-transitory computer executable instructions to cause the one or more processors to (1) receive, via the communication module, sensor data from a first at least one of the plurality of devices, wherein the sensor data is indicative of at least one potential change in at least one of the various conditions associated with the property. The one or more processors may be configured to (2) detect, by the one or more processors, a potential insurance-related event associated with the property through analyzing the sensor data, and/or (3) determine, by the one or more processors, a corrective action to be performed or otherwise taken by a second at least one of the plurality of devices, to mitigate or prevent damage associated with the potential insurance-related event. The one or more processors may be further configured to perform the action, or direct or cause the action to be performed, such as directing the smart device to perform a certain function or corrective action. The system may include additional, less, or alternate components and functionality, including that discussed elsewhere herein.

In still another aspect, a non-transitory computer-readable storage medium storing processor-executable instructions may be provided. When executed, the instructions may cause one or more processors to (1) receive, via a communication network or data transmission, sensor data from at least one of a plurality of devices. The sensor data may be indicative of at least one potential change in at least one of the various conditions associated with a property. The instructions may cause the one or more processors to (2) detect, by the one or more processors, a potential insurance-related event associated with the property through analyzing the sensor data, and/or (3) determine, by the one or more processors, a corrective action to take to mitigate or prevent damage associated with the potential insurance-related event. The instructions may further cause the one or more processors to (4) perform the action, or direct or cause the action to be performed, such as directing a second at least one of the plurality of devices to perform certain functions. The non-transitory computer-readable storage medium may include additional, fewer, or alternate instructions, including those discussed elsewhere herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 6A depicts an exemplary interface, displayable by an electronic device, for alerting a homeowner about an insurance-related risk in accordance with some embodiments.

FIG. 6B depicts an exemplary interface, displayable by an electronic device, for taking a mitigative action in response to an alert in accordance with some embodiments.

DETAILED DESCRIPTION

Figure 1:
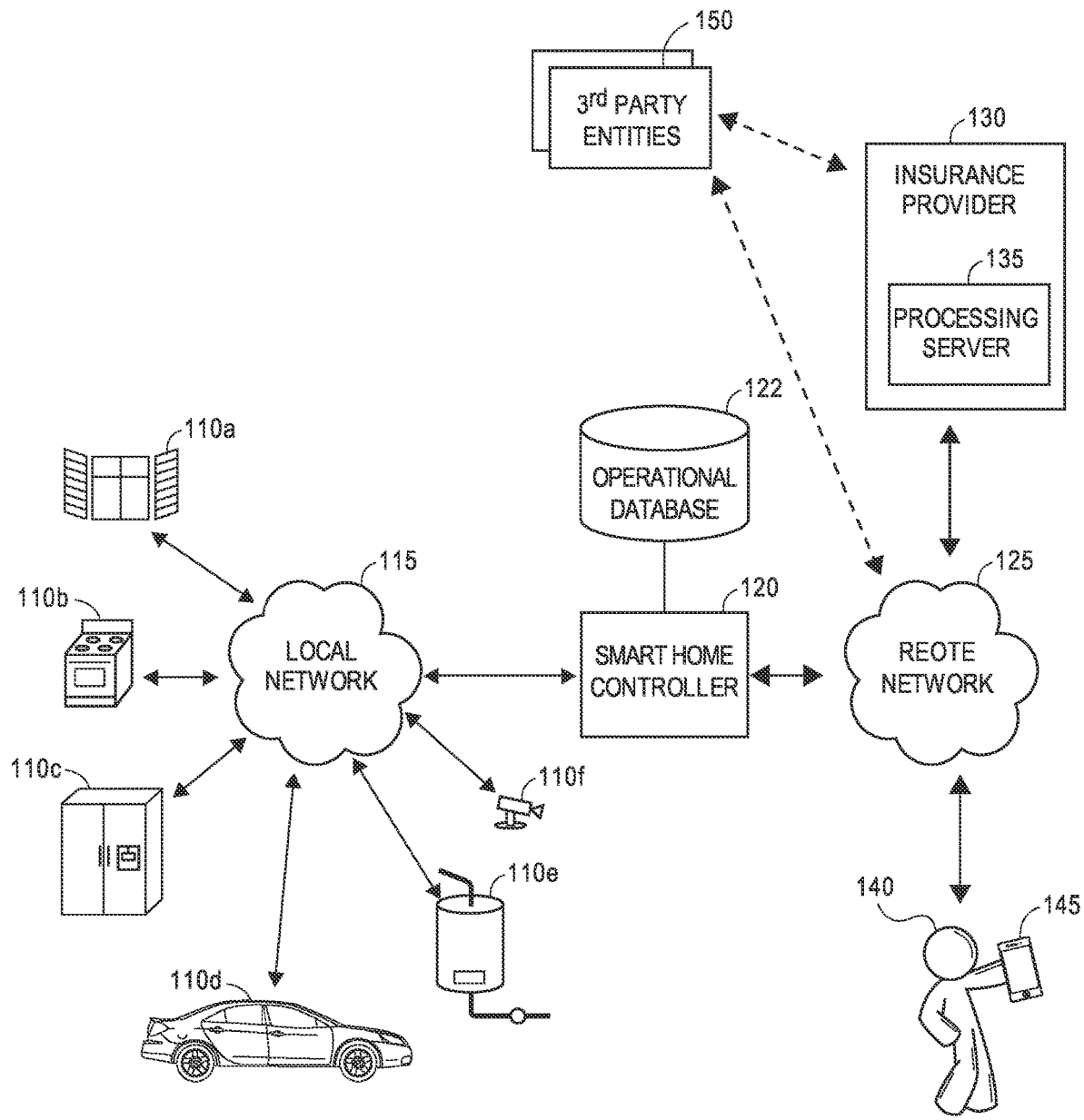
FIG. 1 depicts an exemplary environment including components and entities associated with performing a mitigative action in response to detecting a risk of an insurance-related event in accordance with some embodiments.

The present embodiments may relate to, inter alia, the prevention, detection, mitigation, and/or alleviation of damage to the home or other property, household furniture, appliances, electronics, vehicles (e.g., cars, boats, motorcycles) and/or other personal belongings (e.g., clothing, jewelry, antiques). The damage may be caused by water, fire, hail, wind, and/or other sources. The present embodiments may also relate to (a) providing and updating insurance policies; (b) the handling or adjusting of home insurance claims; (c) the disbursement of monies related to insurance claims; (d) providing discounts on insurance; (e) insurance rebate or reward programs; (f) providing insurance coverage or equipment recommendations; and/or (g) other insurance-related activities.

A home may have a "smart" central controller (referred to as a "smart home controller" herein) and be wirelessly interconnected, or even hard-wired, with various household related items and/or sensors. Despite being referred to as the "smart home controller," the central controller may be associated with any type of property, such as offices, restaurants, farms, and/or other types of properties. The smart home controller may be in wireless or wired communication with various smart appliances (e.g., clothes washer, dryer, dish washer, refrigerator, etc.), smart heating devices (e.g., furnace, space heaters, etc.), smart cooling devices (e.g., air conditioning units, fans, ceiling fans, etc.), smart plumbing fixtures (e.g., toilets, showers, water heaters, piping, interior and yard sprinklers, etc.), smart cooking devices (e.g., stoves, ovens, grills, microwaves, etc.), smart wiring, lighting, and lamps, smart personal vehicles, smart thermostats, smart windows, doors, or garage doors, smart window blinds or shutters, and/or other smart devices and/or sensors capable of wireless or wired communication. Each smart device (or smart sensor), as well as the smart home controller, may be equipped with a processor, memory unit, software applications, wireless transceivers, local power supply, various types of sensors, and/or other components.

The smart home controller may remotely gather data from the smart devices (or smart sensors) dispersed around or otherwise interconnected within the property. The smart home controller may also receive data from an insurance provider (or other third party sources) that monitors potential risks to the property, such as inclement weather, crime patterns, recall data pertaining goods disposed on or proximate to the property and/or other risks. The smart home controller may analyze the data and automatically detect actual or potential issues that may cause or eventually lead to home damage. Upon detection of an actual or potential problem, the smart home controller may issue commands or messages via wireless or wired communication networks that may serve to prevent or mitigate home or personal property damage.

As an example, the smart home controller may receive signals from smart devices indicating a water-related issue, such as a broken pipe or plumbing, running toilet, leaking refrigerator, broken interior or exterior sprinkler system, leaking hot tub or pool, flooding in the basement of the home due to rain, frost melt, or other causes. Upon detecting a water-related issue, the smart home controller may issue (via wireless or wired communication or data transmission) command(s) to water shut-off valves associated with the leak to automatically shut, start or operate de-watering equipment, issue a text or other type of message to the homeowner, notify the homeowner's insurance provider, and/or take other actions.

The smart home controller may also detect an existing or potential temperature or weather issue. As an example, if the temperature is forecasted to be extremely cold, the smart home controller may cause via wireless or wired communication, a smart thermostat or smart appliance to adjust the temperature within the property. The smart home controller may also remotely shut off or close various water supply valves, or put such supply valves on a slow drip or trickle flow to prevent pipes from freezing. If the weather is forecasted to be extremely wet, the smart home controller may cause, via wireless or wired communication, exterior de-watering equipment to activate or to limit the operation of exterior sprinklers. If the weather is forecasted to be hot, the smart home controller may cause, via wireless or wired communication, windows or sun blinds to automatically adjust or close. If the weather is forecasted to have strong winds or a hurricane, the smart home controller may cause, via wireless or wired communication, window storm shutters to automatically adjust or close. The smart home controller may also take other actions in response to temperature or weather conditions, including those discussed elsewhere herein.

The smart home controller may further detect that various equipment may have failed or is about to fail. The smart home controller may analyze energy usage associated with the equipment; the amount of time that the equipment has been in use; the number of times that the equipment has cycled on and off; e-signatures of motors or circuit boards that control equipment (such as furnaces, air conditioners, or other equipment); vibration of, or noise created by, motors or pumps, maintenance records; and/or other sources of information. The smart home controller may shut down equipment identified as faulty, questionable, or in need of maintenance or repair; limit the operation of such equipment; issue a related text or other message to the home owner and/or insurance provider; and/or take other corrective actions.

The information gathered by the smart home controller from the various smart devices and/or sensors disbursed around the property may be utilized for insurance purposes. The information may be used to process or manage insurance covering the home, personal belongings, vehicles, etc. The information gathered by the sensors also may be used to: (1) provide insurance or equipment discounts to customers; (2) update current customer policies and rates based upon smart home functionality and damage prevention and/or mitigation features; (3) initiate or handle insurance claims, and/or calculate more accurate claim amounts; (4) facilitate claim amount disbursements or adjustments; (5) develop or enhance a customer rewards or rebate program; (6) provide various insurance and/or equipment recommendations (such as recommendations related to energy savings, alternate or green energy, and/or smart home equipment) to the insured; (7) determine the sources of loss and/or the sequence of events leading to home damage; and/or (8) provide other insurance products or adjustments.

In one aspect, the information gathered via the sensors may be used for insurance underwriting, risk assessment, and/or loss control. The information may be applied to usage-based insurance associated with the property, equipment on the property, and/or smart vehicles. For instance, a smart home controller may gather (a) vehicle use or usage information directly from a smart vehicle control system via wireless communication, or (b) information related to appliances, electronics, or other equipment use, and/or energy, electricity, gas, or water use thereby, such as from smart electrical, gas, or water meters.

The systems and methods discussed herein address a challenge that is particular to home automation. In particular, the challenge relates to a lack of user ability to effectively control certain components within a property when an insurance-related event is detected. This is particularly apparent when the user is not aware of any property issues and, if the user is aware of a property issue, the user is not able to properly mitigate the issue while remote from the property. For example, the user may be unable to shut off a water supply in time to mitigate damage. Instead of a property manager physically traveling to the property or notifying additional individuals or emergency services to manually mitigate the issue, as required by conventional home systems, the systems and methods dynamically determine how to mitigate an issue and proactively issue commands to one or more devices within the property to adjust operation accordingly. In additional implementations, the systems and methods enable remote users to adjust operation according to any identified issues. Therefore, because the systems and methods employ dynamic and remote operation of connected devices within a property, the systems and methods are necessarily rooted in computer technology in order to overcome the noted shortcomings that specifically arise in the realm of home automation.

Similarly, the systems and methods provide improvements in a technical field, namely, home automation. Instead of the systems and methods merely being performed by hardware components using basic functions, the systems and methods employ complex steps that go beyond the mere concept of simply retrieving and combining data using a computer. In particular, the hardware components compile operation data of connected devices, analyze the operation data, determine how to mitigate an issue, communicate relevant data between or among a set of devices, dynamically adjust device operation, and enable remote device operation by a user, among other functionalities. This combination of elements impose meaningful limits in that the operations are applied to improve home automation by improving the consolidation and analysis of operation data, and by facilitating and/or enabling the efficient adjustment of connected device operation in a meaningful and effective way.

The systems and methods therefore may offer a benefit to customers by enabling homeowners to receive sufficient warning about actual and potential threats to the home. By alerting homeowners about these threats and automatically taking preventative and/or mitigating actions, the smart home controller may reduce the amount of damage to the homeowner's home and/or personal property. Further, insurance providers may experience a reduction in the number of claims and/or a reduction in the amount claimed as a result of the preventative actions, thus reducing their overall liabilities. The present systems and methods may also provide improvements to the technological fields of insurance, home construction, appliance manufacturing, urban planning, and agriculture.

I. Exemplary Environment for Preventing Home Damage

FIG. 1 depicts an exemplary environment 100 associated with preventing and/or mitigating damage to a home. Although FIG. 1 depicts certain entities, components, and devices, it should be appreciated that additional or alternate entities and components are envisioned.

As illustrated in FIG. 1, the environment 100 may include a plurality of smart devices 110 that may be each connected to a local communication network 115. As shown in FIG. 1, the plurality of smart devices 110 may include smart window shutters 110a, a smart oven 110b, a smart refrigerator 110c, a smart vehicle 110d, a smart water supply 110e, and/or a smart surveillance camera 110f. Although FIG. 1 depicts six smart devices in the environment 100, it should be appreciated that additional or fewer smart devices may be present in other embodiments. In some cases, the smart devices may be purchased from the manufacturer with the "smart" functionally incorporated therein. In other cases, the smart devices may have been purchased as "dumb" devices and subsequently modified to add the "smart" functionality to the device. For example, a homeowner may install a motor system on window shutters that is capable of transmitting the open/close status of the shutters and remotely receiving instructions to open or close the shutters. As another example, when a vehicle owner enrolls in a usage-based vehicle insurance policy, the vehicle owner may be provided a smart device that is able to monitor the miles driven by the vehicle and, upon returning to the home, the smart device may communicate the number of miles driven since previously departing.

The plurality of smart devices 110 may be configured to communicate with a smart home controller 120 via the local communication network 115. The local network 115 may facilitate any type of data communication between devices and controllers located on or proximate to the property via any standard or technology (e.g., Bluetooth®, RFID, X10, UPnP®, IEEE 802 including Ethernet, GSM, CDMA, LTE, and/or others). According to present embodiments, the plurality of smart devices 110 may transmit, to the smart home controller 120 via the local network 115, operational data gathered from sensors associated with the plurality of smart devices 110. The operational data may be audio data, image or video data, or status data. For example, the operational data may indicate the flow rate of water through a pipe, the amount of energy consumed by the smart device, the on/off status of a smart device, the sound a smart device makes, and/or other information pertinent to determining the presence of an insurance risk.

The smart home controller 120 may analyze the received operational data and transmit, via the local network 115, instructions or commands to the plurality of smart devices 110. As an example, the smart home controller 120 may determine that the gas flow to the smart oven 110b is above a certain threshold, even when the operational data from smart oven 110b indicates that smart oven 110b is turned off. As a result, the smart home controller 120 may determine that there is a gas leak in either the gas pipes leading to the smart over 110b or in smart oven 110b itself. To mitigate the risk of damage to the property, the smart home controller 120 may issue a command, via the local network 115, to a smart gas valve to shut off the supply of gas to the smart oven 110b. In some embodiments, the smart gas valve may transmit, to the smart home controller 120 via the local network 115, a confirmation that the mitigative action has been successfully performed.

According to present embodiments, the smart home controller 120 may be coupled to a database 122 that stores past operational data associated with the plurality of smart devices 110 or otherwise associated with "normal" operation of the plurality of smart devices 110. In some embodiments, the database 122 may organize the past operational data according to which individual smart device the data is associated. The smart home controller 120 may analyze the operational data to develop a baseline model for normal operation of the plurality of smart devices 110. When new operational data is received, the smart home controller 120 may store the new data in the database 122 and then compare the new operational data to the baseline model in order to determine variations from normal operation indicative of an actual or potential insurance risk. Returning to the gas oven example, the average rate of gas flowing through a pipe to the smart oven 110b may exceed the rate in the normal operation model for a given duration and/or time of day. The smart home controller 120 may determine that this difference between the operational data and the baseline model indicates that there is a potential gas leak associated with smart oven 110b and take appropriate or corrective preventative and/or mitigative measures. Although FIG. 1 depicts the database 122 as coupled to the smart home controller 120, it is envisioned that the database 122 may be maintained in the "cloud" such that any element of the environment 100 capable of communicating over either the local network 115 or a remote network 125 may directly interact with database 122.

The smart home controller 120 may also be in communication with an electronic device 145 associated with the homeowner 140 via the remote network 125. The electronic device 145 associated with the homeowner 140 may be a smartphone, a desktop computer, a laptop, a tablet, a smart watch, smart glasses, phablet, smart contact lenses, wearable electronics, pager, personal digital assistant, computing device configured for wireless communication, or any other electronic device. The remote network 125 may facilitate any data communication between the smart home controller 120 located on the property and entities or individuals remote to the property via any standard or technology (e.g., GSM, CDMA, TDMA, WCDMA, LTE, EDGE, OFDM, GPRS, EV-DO, UWB, IEEE 802 including Ethernet, WiMAX, and/or others). In some cases, both the local network 115 and the remote network 125 may utilize the same technology. Although FIG. 1 depicts the smart home controller 120 and the homeowner 140 in communication via the remote network 125, there are embodiments in which the homeowner 140 is on the property and in communication with the smart home controller 120 via the local network 115.

In some embodiments, when the smart home controller 120 determines that an actual or potential insurance risk exists, the smart home controller 120 may send a notification detailing the risk to the electronic device 145 via the remote network 125. The notification may include, inter alia, the source of the risk, the smart device(s) impacted by the risk, visual data depicting the risk and/or impacted device(s), recommendations to prevent and/or mitigate the risk, and which actions, if any, have been automatically performed. In some embodiments, the electronic device 145 may provide an interface such that the homeowner 140 may select a recommended action to prevent and/or mitigate the risk. The interface may also enable the homeowner 145 to select any other action(s) supported by the plurality of smart devices 110. In response to receiving the selection, the electronic device 145 may communicate a command to the smart home controller 120 via the remote network 125 to instruct the plurality of smart devices 110 to perform the selected action. It should be appreciated that a command does not need to be generated in response to receiving a notification about an actual or potential insurance risk and that the homeowner 140 may be able to generate commands using the electronic device 145 at any time.

The smart home controller 120 may also be in communication with an insurance provider 130 via the remote network 125. According to present embodiments, the insurance provider 130 may include one or more hardware server(s) 135 configured to facilitate the functionalities described herein. Although FIG. 1 depicts the insurance provider 130, it should be appreciated that other entities that are capable of monitoring risk are envisioned. For example, a general contractor may aggregate the insurance risk data across many properties to determine which appliances or products provide the best long-term value after accounting for maintenance and cost of repair fees. Further, although FIG. 1 depicts the hardware server 135 as part of the insurance provider 130, it should be appreciated that the hardware server 135 may be separate from (and connected to or accessible by) the insurance provider 130 or other entity interested in monitoring the data described herein.

According to present embodiments, the insurance provider 130 may receive data from third party entities 150 pertaining to insurance risks that may potentially impact a property. For example, the insurance provider 130 may receive information from a weather service about a violent storm forecasted in the vicinity of the property. The insurance provider 130 may also receive information about crime reports, traffic, pollution, insect swarms, or any other type of information that may be useful to prevent or mitigate insurance risks. Based upon an analysis of the data received from the third party entities 150, the insurance provider 130 may transmit instructions to the smart home controller 120, via the remote network 125, to notify the homeowner 140 about a potential insurance risk and/or automatically take a preventative or mitigative action. It should be appreciated that in some embodiments, the third party entities 150 may be able to communicate directly with the smart home controller 120.

The smart home controller 120 may also transmit, to the insurance provider 130 via the remote network 125, information about the determined potential or actual insurance risk and/or whether an action to prevent or mitigate the risk has been successfully performed. The insurance provider 130 may use the received information to identify and facilitate an insurance-related activity. For example, if the insurance provider 130 determines that the smart home controller 120 detected a potential leak and successfully prevented damage to the property, the insurance provider 130 may issue a rebate to an insurance account associated the property. Conversely, in another example, despite the smart home controller 120 notifying the homeowner 140 about a potential risk, the homeowner 140 may take no action to prevent or mitigate the risk. If the risk is realized and actually causes damage to the property, the insurance provider 130 may reduce the amount of damage the homeowner 140 is allowed to claim in a subsequent insurance claim. The exemplary environment 100 may include additional, fewer, or alternate equipment or components, including those discussed elsewhere herein.

II. Exemplary Operational Status Communication

Figure 2:
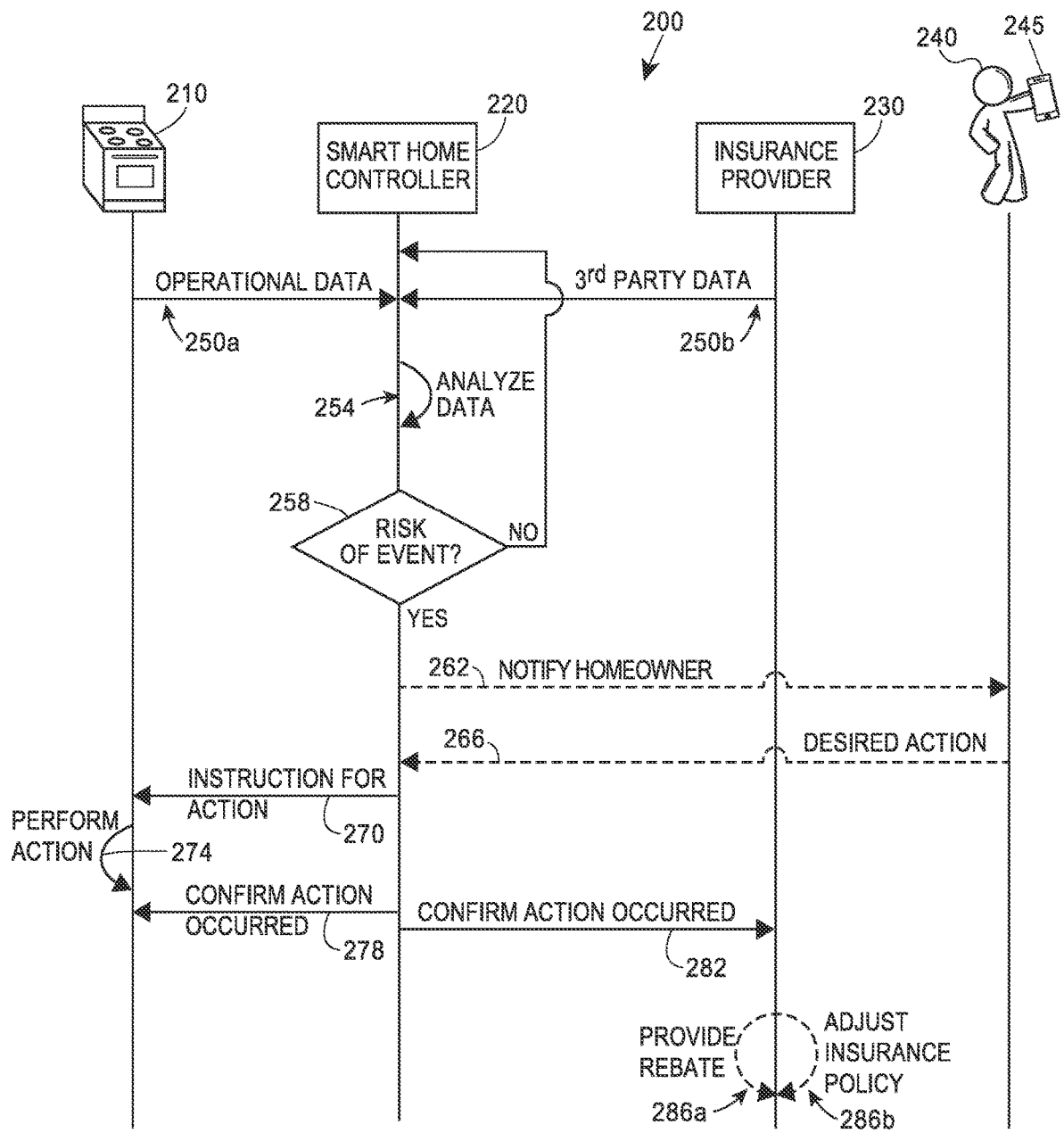
FIG. 2 depicts an exemplary diagram associated with determining that a property is at risk for an insurance-related event and performing a mitigative action in accordance with some embodiments.

Referring to FIG. 2, illustrated is a signal diagram 200 associated with detecting an actual or potential risk for damage to a property, taking an action to prevent or mitigate the risk and subsequently performing an insurance-related activity. In particular, FIG. 2 may include a smart device 210 (such as any of the plurality of smart devices 110 as described with respect to FIG. 1), a smart home controller 220 (such as the smart home controller 120 as described with respect to FIG. 1), an insurance provider 230 (such as the insurance provider 130 as described with respect to FIG. 1), and a homeowner 240 (such as the homeowner 140 as described with respect to FIG. 1) associated with an electronic device 245 (such as the electronic device 145 as described with respect to FIG. 1). In some embodiments, the smart home controller 220 may be coupled to a database that stores past operational data (such as the archival database 122 as described with respect to FIG. 1). Although FIG. 2 depicts the smart device 210 as a smart oven, the smart device 210 may be any smart device on or proximate to a property. Further, although FIG. 2 depicts a single smart device, the smart home controller 220 may be in communication with any number of smart devices on or proximate to a property. It should be appreciated the electronic device 245 may be any electronic device (e.g., a smartphone, a desktop computer, a laptop, a tablet, phablet, netbook, notebook, a smart watch, smart glasses, smart contact lenses, wearable electronics device, mobile device, etc.).

The signal diagram 200 may begin when the smart device 210 transmits (250a) operational data to the smart home controller 220 and/or when the insurance provider 230 transmits (250b) data from third party reporting agencies to the smart home controller 220. The operational data may include information pertaining to the operation of the smart device 210, such as audio data, visual data, and data regarding the status of any characteristic of the operation of the smart device 210. The smart device 210 may be configured to transmit the operational data at a regular interval (e.g., every ten seconds) and/or in response to a trigger event (e.g., when the smart device 210 is powered on). It should be appreciated the length of the regular interval may vary based upon the type of smart device 210 and the operational state of smart device 210.

The insurance provider 230 may transmit, to the smart home controller 220, data it has received from one or more various third party reporting agencies or entities. The data provided by the third party reporting agencies may include information that describes weather or crime patterns that place a property at risk for suffering damage. The insurance provider 230 may transmit the data to the smart home controller 220 in a periodical report (e.g., daily or bi-daily) or in response to a trigger event (e.g., the National Weather Service® issuing a severe storm warning). It should be appreciated that in some embodiments, the smart home controller 220 may receive the data directly from the third party reporting agencies instead of from the insurance provider 230.

After receiving the operational data from the smart device 210 and/or after receiving the third party data from the insurance provider 230, the smart home controller 220 may analyze (254) the received data. In some embodiments, the smart home controller 220 may compare the operational data received from the smart device 210 to a baseline model for normal operational behavior for the smart device 210, where the baseline model may be stored in the archival database. After accounting for the status of smart device 210 (e.g., whether the device is turned on or off, indoor/outdoor temperature, etc.), the smart home controller 220 may calculate a variance between the received operational data and the baseline model. As example, a change in the resting energy consumption of the smart device 210 may indicate that the smart device 210 is about to fail and/or is in need of repair. The magnitude of the allowed variance may change based upon the parameter and the type of smart device 210. For example, a slight change in the rate of water flow into a faucet may indicate a water leak, whereas a similar change in rate of water flow through a water main may be part of normal fluctuations in household water usage.

Some operational parameters may indicate a potential risk of property damage independent of a comparison against a baseline model. For example, if a water tank sends operational data that the water level is higher than a fill level, it is indicative that the water tank may overflow or is currently overflowing. As another example, a smart window may have a shatter sensor that sends a status update to the smart home controller 220 when the glass breaks. In some embodiments, if the parameter is independently indicative of a potential risk, the smart device 210 or the insurance provider 230 may transmit, to the smart home controller 220, an instruction to cause the smart home controller 220 to facilitate preventing or mitigating the risk.

If the smart home controller 220 analyzes the received data and determines that a potential or actual risk does not currently exist ("NO"), processing may return to the beginning of the signal diagram 200 where the smart home controller 220 may await new data from the smart device 210 and/or insurance provider 230. In contrast, if the smart home controller 220 determines that there is a potential or actual risk of property damage ("YES"), the smart home controller 220 may determine an appropriate or corrective action to prevent or mitigate the risk. It should be appreciated that in embodiments in which the smart device 210 or insurance provider 230 transmits an instruction to prevent or mitigate a risk, the smart home controller 220 may interpret the instruction as an indication that a risk exists and that the appropriate or corrective action is the one indicated by the smart device 210 or insurance provider 230. Returning to the broken window example, the smart window may additionally transmit an instruction to the smart home controller 220 to send a command that closes smart shutters. Subsequently, the smart home controller 220 would transmit the instructed command to the smart shutters. In response, the smart shutters would execute the command and move the shutters into a "closed" position and have them remain closed until repaired.

It should be appreciated that in some embodiments, rather than detecting whether a potential or actual risk of damage exists, the smart home controller 220 may determine whether an ongoing risk has dissipated. For example, if the aforementioned broken window has been replaced by a new, non-shattered window, the smart home controller 220 may determine that the risks posed by a broken window are no longer present. In such embodiments, "NO" indicates that that an ongoing risk is still exposing the property to a risk and "YES" indicates that the ongoing risk has concluded. If the risk has concluded, the smart home controller 220 may determine an action that causes the property to return to a "normal" state. For example, the previous command to keep the smart shutters in the "closed" position may be overruled by a new action that enables the homeowner 240 to open the smart shutters again.

In some embodiments, the smart home controller 220 may notify (262) the homeowner 240 about the potential or actual risk of property damage. The notification may be sent to the electronic device 245 associated with homeowner 240. The notification may be in the form of an email, a text message, a phone call, an alert generated by an application running on electronic device 245, or any other means of notifying the homeowner 240 about the actual or potential risk of damage. The notification may contain information detailing the risk, such as, inter alia, an identification of the risk, how the risk was detected, which part of the property is potentially affected, what belongings are in the potentially affected part of the property, a likelihood that the risk is realized, and/or actions that may be taken to prevent or mitigate the risk of damage. The notification may also include any audio and/or visual data collected by sensors associated with the smart device 210.

In response to receiving the notification, the electronic device 245 may also provide an interface for the homeowner to select an action to prevent or mitigate the risk. In some cases, the interface may present a recommended action or set of actions based upon the previous analysis. The interface may also enable the homeowner 240 to browse through a list of all of the smart devices associated with the property and choose any supported action(s). In some cases, the action may be issuing an instruction to the smart device 210 and/or any other smart device on or proximate to the property. In other cases, the action may be to monitor a live video feed of the smart device 210 or the property. In still other cases, the action may be to alert an emergency service provider (e.g., police, fire department, hospital, etc.) for assistance. In yet further cases, the homeowner 240 may choose to take no action at all. In embodiments in which the homeowner 240 chooses to issue an instruction to the smart device 210, the electronic device 245 may first transmit (266) the instruction to the smart home controller 220.

After receiving an instruction from the homeowner 240, the smart home controller 220 may forward (270) the instruction to the smart device 210. In some embodiments, the smart home controller 220 may determine an appropriate or corrective action to prevent or mitigate a potential risk and transmit the instruction to smart device 210 without any input from homeowner 240. To this end, the smart home controller 220 may analyze the functionality of all smart devices on the property and determine if any smart devices are capable of mitigating or preventing the risk. For example, if the smart home controller 220 determines that a toilet is leaking, the smart home controller 220 may automatically determine that shutting off the supply of water to the toilet or bathroom may mitigate water damage and generate an instruction that, when executed, causes the water supply to shut off. However, the smart home controller 220 may also determine that flushing the toilet may not mitigate water damage and, as such, the smart home controller 220 may not generate an instruction that, when executed, causes the toilet to flush.

In some embodiments, if the homeowner 240 transmitted instructions that the smart home controller 220 determines are insufficient to properly prevent or mitigate the risk, the smart home controller 220 may automatically transmit additional instructions to smart device 210. For example, the smart home controller 220 may detect that a hot water heater in the basement is leaking, causing water to pool. After notifying the homeowner 240 about the leak, the homeowner 240 may transmit an instruction that causes the water supply to the hot water heater to shut off. However, the smart home controller 220 may further determine that there is still the risk of electrocution due to the presence of electronics in the flooded basement. The smart home controller 220 may supplement the instruction from the homeowner 240 that causes the water supply to shut off with another instruction that causes the electronics in the basement to power off.

The smart device 210 may interpret the received instruction in order to perform (274) the action contained therein. The action may vary depending on the capabilities of the smart device 210 and the risk that the smart home controller 220 is trying to prevent or mitigate. The smart device 210 may perform the instructed action in accordance with the functionality of the smart device 210. For example, an instruction to close a window shutter may be performed by the smart window activating a motor that causes the shutter to move from an "opened" position to a "closed" position. As another example, an instruction to shut off the flow of water or gas may be performed by causing a smart valve (or remotely controlled solenoid valve) to move into a "closed" position. After the smart device 210 performs the action as instructed, the smart device 210 may transmit (278) a confirmation that the action has been performed to the smart home controller 220.

According to present embodiments, the smart home controller 220 may also inform (282) the insurance provider 230 about the determined actual or potential risk, and any actions that have been performed to prevent or mitigate the risk. In optional embodiments, the smart home controller 220 may also inform the insurance provider 230 as to whether the homeowner 240 was notified about the risk and what, if any, actions the homeowner 240 decided to perform in response to the notification. The insurance provide 230 may use the information to perform various insurance-related activities. For example, if a risk was successfully prevented, the insurance provider 230 may provide (286a) the homeowner 240 with a rebate on his or her insurance policy. The insurance provider 230 may also adjust (286b) an insurance premium for an insurance account associated with the homeowner 240. Other actions may include, without limitation, adjusting an insurance policy, providing the homeowner 240 with a discount or reward points, adjusting an insurance claim, and providing recommended actions or replacement devices that may be reduce the risk of future insurance-related events. It should be appreciated that the insurance provider 230 may perform any number of insurance-related activities. In some embodiments, the insurance provider 230 may send a notification to the smart home controller 220 and/or homeowner 240 detailing the undertaken insurance-related activities.

III. Exemplary Method of Automatic Risk Mitigation

Figure 3:
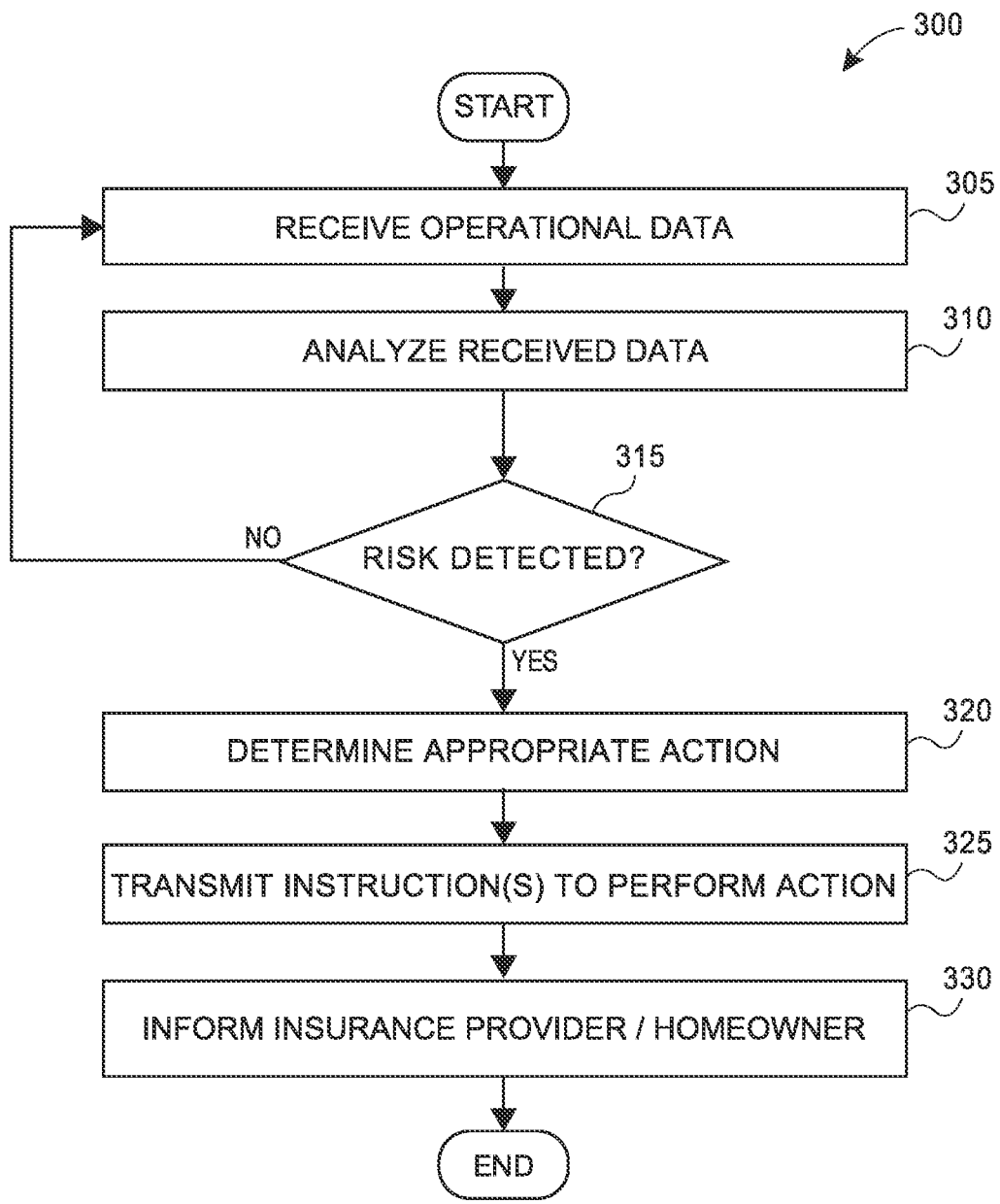
FIG. 3 depicts an exemplary flow diagram associated with a smart home controller determining that a property is at risk for an insurance-related event and automatically performing a mitigative action in accordance with some embodiments.

Referring to FIG. 3, depicted is a block diagram of an exemplary method 300 for automatically issuing an instruction to mitigate or prevent a risk of damage to a property. The method 300 may be facilitated by a smart home controller (such as the smart home controller 120 as depicted in FIG. 1) in communication with a plurality of smart devices (such as the plurality of smart devices 110 as depicted in FIG. 1), an insurance provider (such as the insurance provider 130 as depicted in FIG. 1), and/or a homeowner (such as the homeowner 140 as depicted in FIG. 1).

The smart home controller may receive operational data from a plurality of smart devices or an insurance provider (block 305). The received data may be analyzed to determine whether there is an actual or potential risk of property damage (block 310). As a part of the analysis, the smart home controller may determine if there is a risk of weather damage, water damage, fire damage, equipment failure, and/or any other potential source of damage to the property.

The smart home controller may determine or identify a number of actual or potential weather-related risks. For example, the smart home controller may be able determine actual or potential risks of high winds, thunderstorms, tornadoes, hurricanes, rain, flooding, snow, ice, heat, cold, extreme heat or cold, frost melt, high water, and/or other conditions. The smart home controller may determine or identify the weather-related risks from data transmitted by smart devices such as thermometers, rain gauges, wind meters, or other weather meters or sensors. Additionally or alternatively, the smart home controller may be able to receive current weather conditions, past weather conditions, and/or weather forecasts from an insurance provider or directly from weather monitoring service (such as the National Weather Service®).

Further, the smart home controller may determine or identify a number of actual or potential water-related risks. For example, the smart home controller may be configured to determine actual or potential water leaks from data transmitted by smart devices such as probes, visual capturing devices (cameras, video recorders, security systems, etc.), acoustic sensors, temperature gradient sensors, flow sensors, pressure sensors, limit switches, moisture or condensation sensors, fluid usage sensors, water sensors in the home or yard, and/or other types of sensors and devices. The smart home controller may analyze the received data from the smart devices to detect free standing water in the vicinity of the property and/or on neighboring property, determine actual or predicted frost melt, water usage, sump pump failure, motor overheat or unusual e-signatures (such as for motors or pumps related to de-watering equipment), and/or other conditions.

For example, the smart home controller may infer a water leak based upon the time frame, or amount of time, that the water has been running. As another example, the smart home controller may predict whether de-watering equipment (such as sump pumps and irrigation equipment) may be unable to keep up with expected capacity or need. In order to determine the capabilities of the de-watering equipment, the smart home controller may learn the history of the de-watering equipment, recognize the impending water events (such as via weather forecasts) and determine if the predicted water volumes may be handled by the current de-watering equipment.

Additionally, the smart home controller may determine or identify a number of actual or potential fire-related risks. The smart home controller may be configured to determine actual or potential fire-related risks from data transmitted by smart devices associated with sensors, such as smoke detectors, fire monitors, heat sensors, thermometers, and/or others. For example, the smart home controller may analyze the received data from the aforementioned sensors to detect abnormal conditions associated with gas or natural gas lines (high pressure, gas leaks, abnormal flow, etc.) and/or identify the presence of smoke or fire.

Also, the smart home controller may determine or identify a number of actual or potential equipment failure risks. The smart home controller, using the operational data gathered by the plurality of smart devices on, or proximate to, the property, may analyze the status or operational behavior of the plurality of smart devices. As described elsewhere herein, the smart home controller may compare the current operation of a smart device to a baseline model to determine if it is likely that equipment has failed or is about to fail. The smart controller may also receive data from the insurance provider about the reliability or durability of the smart device as determined by manufacturers and/or other ratings agencies.

The smart home controller may then determine if the analysis indicated the presence of a risk (block 315). If the analysis indicates that there are no potential risks ("NO"), then the smart home controller may return to receiving more operational data (block 305). If the analysis detected a potential or actual risk (such as the aforementioned examples) ("YES"), the smart home controller may determine an action or set of actions intended to mitigate or prevent the risk (block 320). For example, if the smart home controller determines that there is a weather-related risk of extreme cold, the smart home controller may determine that an appropriate or corrective action is to adjust a furnace or heater, adjust the flow of water to a trickle flow to prevent pipes from freezing, adjust a water heater, and/or adjust the heating of a pool or water tank. As another example, if the weather-related risk is extreme wetness, the smart home controller may determine than an appropriate or corrective action is to adjust watering (e.g., sprinklers), de-icing (e.g., heaters), or de-watering (e.g., sump pump) equipment. If the smart home controller determines that there is an unexpected water flow, the smart home controller may determine that an appropriate or corrective action may be to shut off a water source to the home or smart device, or shut a specific valve.

In scenarios in which the smart home controller determines that there is a fire-related risk, the smart home controller may determine or identify more details about the fire, such as where the fire is located, the type of fire (e.g., grease, oil, or gas fire), and/or how the fire started. After determining the details, the smart home controller may determine that an appropriate or corrective action may be to shut off potential causes of the fire (such as electricity or gas supplies). If the smart home controller determines that a piece of wiring, lighting, electronics, appliances, and/or other component is the source of the fire, the smart home controller may shut off the smart device. In scenarios in which a fire is actually present, the action may be to activate sprinkler systems, vent hoods, automatic fire extinguishers, and/or other types of fire-fighting equipment and/or alert a fire department.

In scenarios in which the smart home controller determines that there is a risk of equipment failure, the smart home controller may determine an action that limits or prevents the operation of the questionable smart device (or associated equipment) by shutting off the supply of electricity to the smart device (or associated equipment). Further, the smart home controller may recommend a make or model of a new device to replace the faulty device. It should be appreciated that in analyzing the received data, the smart home controller may detect the presence of multiple sources of risk and subsequently determine any combination of the preventative or mitigative actions described herein.

The smart home controller may then transmit the automatically determined instruction(s) to the plurality of smart devices (block 325). The plurality of smart devices may interpret the instructions to perform the desired actions. After transmitting the instructions to the plurality of smart devices, the smart home controller may inform the insurance provider and/or the homeowner about the actual or potential risks and actions performed to prevent or mitigate the risk (block 330). If the insurance provider is informed about the risks and actions, the insurance provider may perform an insurance-related activity to an insurance account associated with the homeowner and/or the property. The method 300 may include additional, fewer, or alternate actions, including those discussed elsewhere herein.

IV. Exemplary Method of Homeowner-Directed Risk Mitigation

Figure 4:
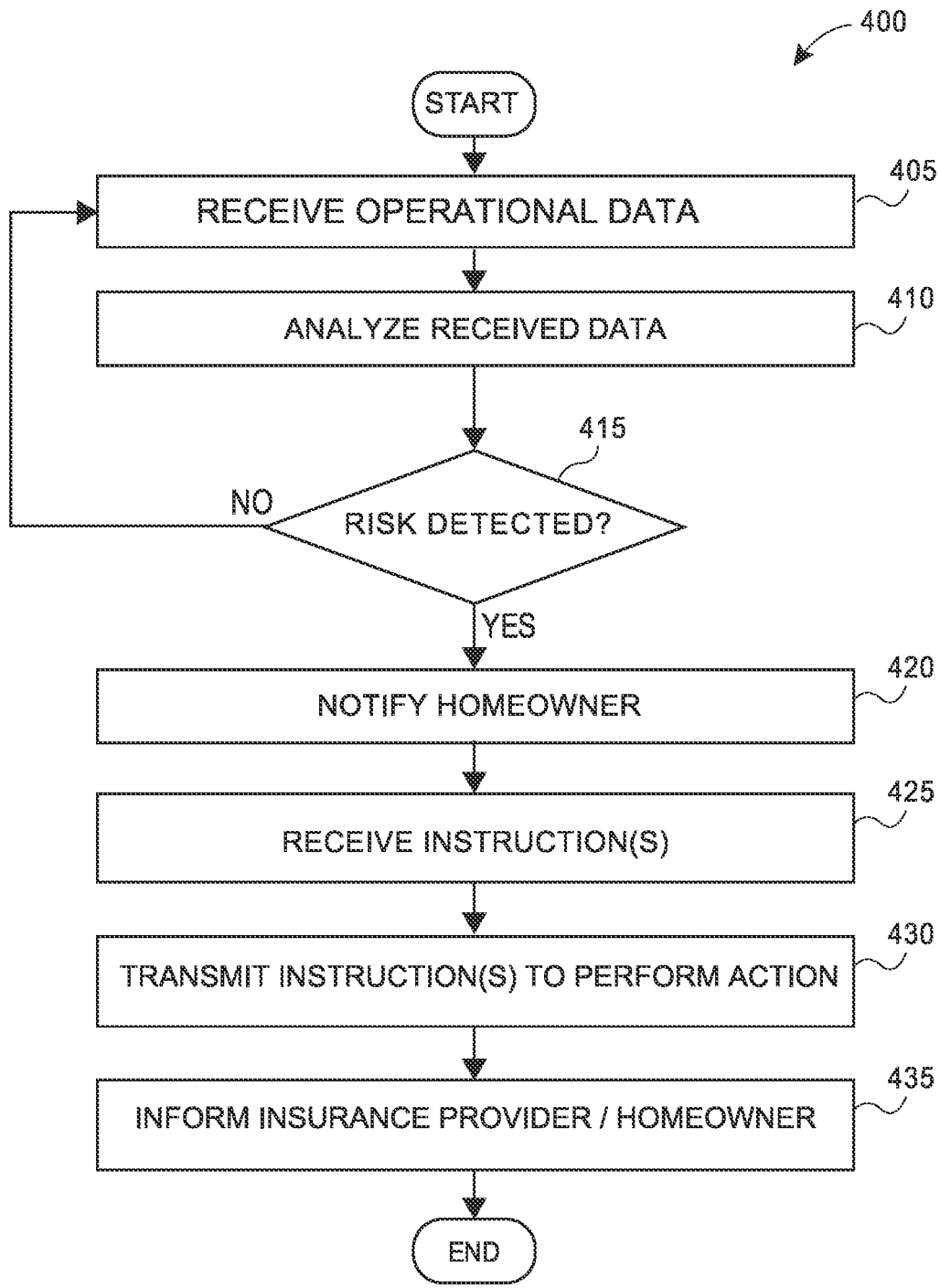
FIG. 4 depicts an exemplary flow diagram associated with a smart home controller determining that a property is at risk for an insurance-related event and performing a mitigative action as directed by a homeowner, in accordance with some embodiments.

Referring to FIG. 4, depicted is a block diagram of an exemplary method 400 for issuing an instruction to mitigate or prevent a risk of damage to a property as directed by a homeowner. The method 400 may be facilitated by a smart home controller (such as the smart home controller 120 as depicted in FIG. 1) in communication with a plurality of smart devices (such as the plurality of smart devices 110 as depicted in FIG. 1), an insurance provider (such as the insurance provider 130 as depicted in FIG. 1), and a homeowner (such as the homeowner 140 as depicted in FIG. 1).

The smart home controller may receive operational data from a plurality of smart devices or an insurance provider (block 405). The received data may be analyzed to determine whether there is an actual or potential risk of property damage (block 410). As a part of the analysis, the smart home controller may determine if there is a risk of weather damage, water damage, fire damage, equipment failure, and/or any other potential source of damage to the property. The smart home controller may then determine if the analysis indicated the presence of a risk (block 415). The steps performed at blocks 405, 410, and 415 may be similar to the steps performed at blocks 305, 310, and 315 respectively, as performed in accordance with method 300.

If the analysis indicates that there are no potential risks ("NO"), then the smart home controller may return to receiving more operational data (block 405). If the analysis detected a potential or actual risk (such as the aforementioned examples) ("YES"), the smart home controller may notify the homeowner (via sending communications to an electronic device associated with the homeowner) about the risk (block 420). The notification to the homeowner may include a recommended action as determined by the smart home controller. The recommended action may be determined in a similar manner as method 300 determines the appropriate or corrective action at block 320.

In response to receiving the notification, the homeowner may choose to send an instruction to perform the recommended action and/or transmit instructions to perform any other action that is supported by the plurality of smart devices. The smart home controller may receive the instruction(s) sent by the homeowner (block 425). As described elsewhere herein, the smart home controller may analyze the received instruction to determine if any further actions are necessary to sufficiently prevent or mitigate a risk of damage. If the received instruction(s) are insufficient, the smart home controller may generate further instructions.

Once the complete set of instructions are received and/or generated, the smart home controller may transmit the instructions to the plurality of smart devices (block 430). The plurality of smart devices may interpret the instructions to perform the desired actions. After transmitting the instructions to the plurality of smart devices, the smart home controller may inform the insurance provider about the actual or potential risks and actions performed to prevent or mitigate the risk, and/or any instructions that the homeowner transmitted (block 435). After the insurance provider is informed about the risks and instructions, the insurance provider may perform an insurance-related activity to an insurance account associated with the homeowner and/or the property. The method 400 may include additional, fewer, or alternate actions, including those discussed elsewhere herein.

V. Exemplary Method of Automatic Water Leak Risk Mitigation

Figure 5:
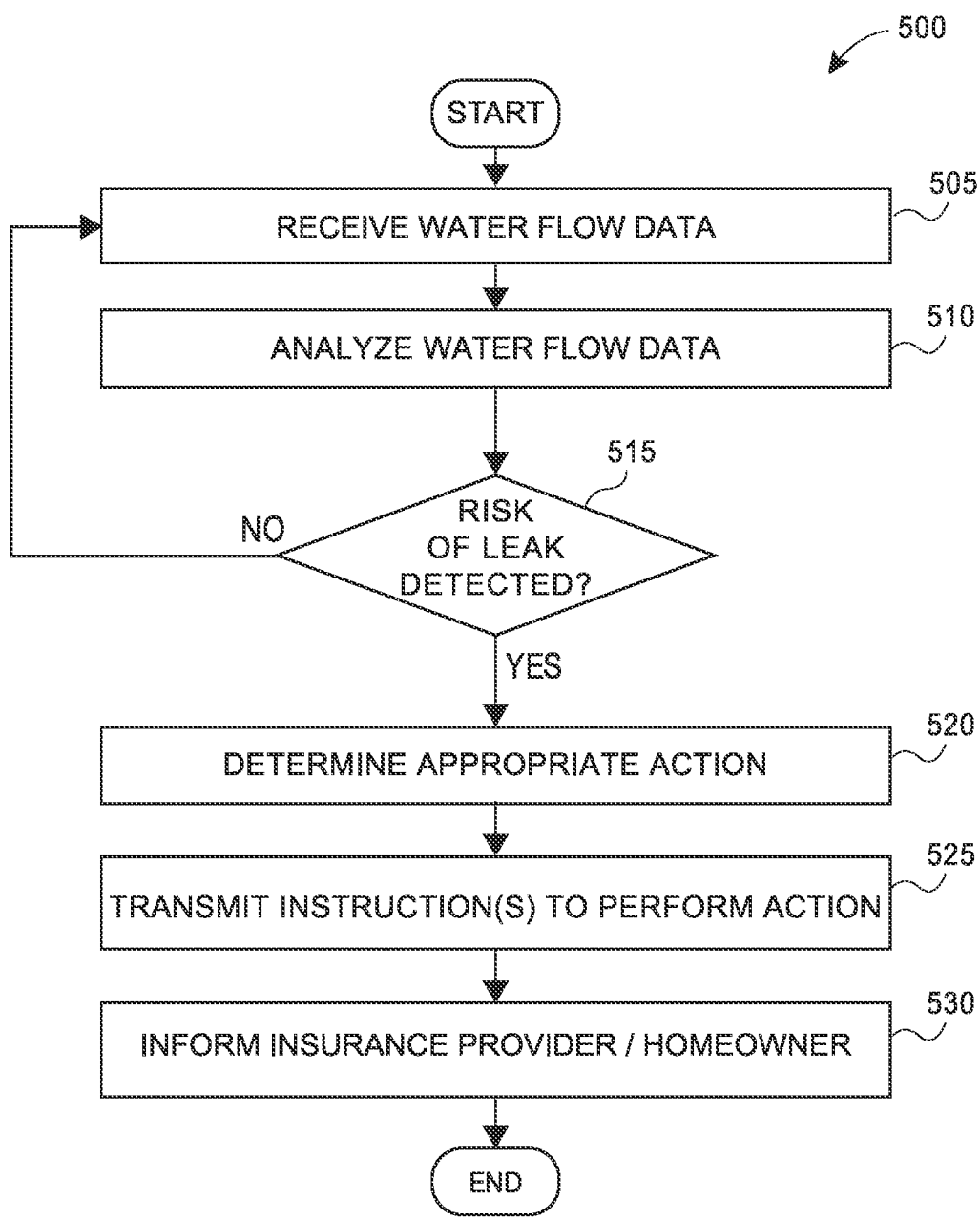
FIG. 5 depicts an exemplary flow diagram associated with a smart home controller determining that a property is at risk for a water leak and automatically performing a mitigative action in accordance with some embodiments.

Referring to FIG. 5, depicted is a block diagram of an exemplary method 500 for issuing an instruction to mitigate or prevent a risk of damage to a property as directed by a homeowner. The method 500 may be facilitated by a smart home controller (such as the smart home controller 120 as depicted in FIG. 1) in communication with a plurality of smart devices (such as the plurality of smart devices 110 as depicted in FIG. 1), an insurance provider (such as the insurance provider 130 as depicted in FIG. 1), and/or a homeowner (such as the homeowner 140 as depicted in FIG. 1).

The smart home controller may receive operational water flow data from a plurality of smart devices or an insurance provider (block 505). The received water flow data may be analyzed to determine whether there is an actual or potential risk of property damage (block 510). The smart home controller may then determine if the analysis indicated the presence of a risk for a water leak (block 515). The steps performed at blocks 505, 510, and 515 are similar to the steps performed at blocks 305, 310, and 315 respectively, as performed in accordance with method 300, in particular when method 300 receives and analyzes data to detect the risk of water damage.

If the analysis indicates that there are no potential risks ("NO"), then the smart home controller may return to receiving more operational water flow data (block 505). If the analysis detected a potential or actual risk (such as the aforementioned examples) ("YES"), the smart home controller may determine an action or set of actions to mitigate or prevent the risk (block 520). The action(s) may be determined in a similar manner as method 300 determines the appropriate or corrective action at block 320 with regards to determining an action to prevent water damage.

The smart home controller may then transmit the automatically determined instruction(s) to the plurality of smart devices (block 525). The plurality of smart devices may interpret the instructions to perform the desired actions to prevent or mitigate damage caused by a water leak. After transmitting the instructions to the plurality of smart devices, the smart home controller may inform the insurance provider and/or the homeowner about the actual or potential risks for a water leak, and actions performed to prevent or mitigate the risk of experiencing a water leak (block 530). If the insurance provider is informed about the risks and actions, the insurance provider may perform an insurance-related activity to an insurance account associated with the homeowner and/or the property. The method 500 may include additional, fewer, or alternate actions, including those discussed elsewhere herein.

VI. Exemplary User Interfaces

An electronic device may provide an interface that enables a homeowner to interact and control a plurality of smart devices disposed on, or proximate to, a property. The interface may be provided as part of an application that is executed on the electronic device. In some embodiments the interface may be provided on the smart home controller additionally or alternatively to the electronic device.

FIG. 6A illustrates an exemplary interface 600 including an alert to a homeowner that identifies a risk of damage to the property. The interface 600 may be presented to the homeowner in response to a smart home controller notifying the homeowner about a detected risk as described elsewhere herein. The interface may provide visual data 605 that allows the homeowner to see a visual representation of a detected risk and/or an affected smart device. In the depicted example, visual data representative of water pooling on the ground near a leaky toilet is displayed. The interface 600 may also include text 610 ("Toilet in Master Bathroom is leaking") that verbally describes the detected risk. The text 610 may include the name of the smart device and its location on the property. It should be appreciated that other data not depicted in FIG. 6A may also be displayed in the alert.

The interface 600 may also provide the homeowner soft buttons that enable the homeowner to take an action. Soft button 615 may enable the homeowner to place a phone call to a party that may be able to mitigate the damage. In the present scenario, selecting the soft button 615 may enable a phone call with a plumber as determined by homeowner preference, proximity to the property, customer satisfaction rating, and/or any other method of selecting a service provider. Soft button 620 may enable the homeowner to be presented with another interface that allows the homeowner to control one or more of the plurality of smart devices on, or proximate to, the property. Soft button 625 may be provided to enable the homeowner to dismiss the notification without taking an action to prevent or mitigate damage. It should be appreciated that interface 600 may provide additional or fewer soft buttons when displaying an alert.

FIG. 6B illustrates an exemplary interface for facilitating a recommended action in response to an alert sent by a smart home controller. The interface 650 may be presented in response to a homeowner indicating a desire to mitigate damage by controlling a smart device (such as by selecting the soft button 620 illustrated in FIG. 6A). The interface 650 may depict visual data 655 representative of the affected smart device, namely the leaky toilet in this example. The interface 650 may also include text 660 ("Shut off water") indicating a recommended action to take to prevent or mitigate damage. Soft button 665 and smart button 670 may enable the homeowner to take or ignore the recommended action, respectively. If the homeowner selects soft button 665, a command to perform the recommended action may be transmitted to the smart home controller. The interface 650 may further provide a drop-down menu 675 that enables the homeowner to select another action that the smart device is capable of performing. It should be appreciated the functionality associated with the drop-down menu 675 may be executed using any method for displaying a list of functionalities that a smart device is capable of performing.

While FIGS. 6A and 6B illustrate interfaces in which the detected risk is for water damage from a leaky toilet, it is envisioned that any actual or potential risk for damage may be represented by interfaces 600 and 650. The depiction of the individual elements in interfaces 600 and 650 may vary based upon the determined actual or potential risk.

Figure 7A:
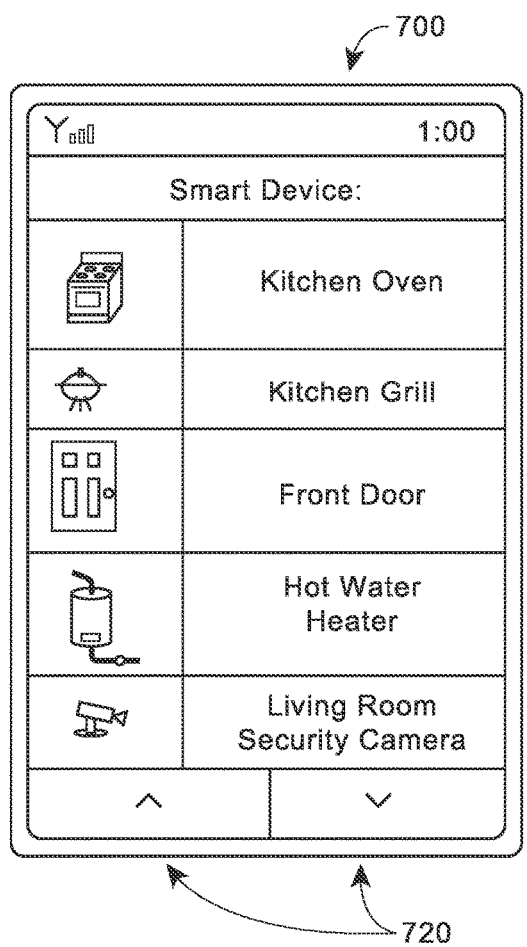
FIG. 7A depicts an exemplary interface, displayable by an electronic device, for selecting a smart device to control in accordance with some embodiments.

FIG. 7A illustrates an exemplary interface 700 that enables a homeowner to control the plurality of smart devices in, or proximate to, a property. The interface 700 may be presented when the homeowner initiates an application to control the plurality of smart devices on, or proximate to, the property. The interface 700 may provide a list 710 of all smart devices currently in, or proximate to, the property. The interface may also provide soft buttons 720 that enable the homeowner to scroll up and down through the list 710. It should be appreciated that the functionality of soft buttons 720 may be implemented through other means (e.g., swiping, physical buttons) instead of soft buttons. The interface 700 may enable the homeowner to select a device from a list 710. In response to the selection of a smart device, the electronic device may present an interface to control the selected smart device.

Figure 7B:
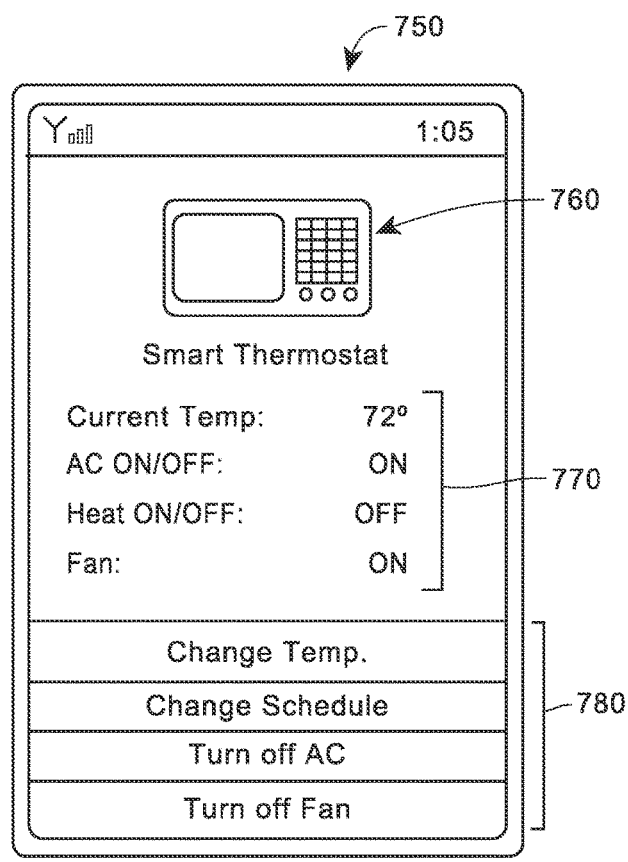
FIG. 7B depicts an exemplary interface, displayable by an electronic device, for controlling a smart device in accordance with some embodiments.

FIG. 7B illustrates an exemplary interface 750 that enables a homeowner to control an individual smart device. The interface 750 may provide a visual representation 760 of the smart device that may be controlled by interface 750. The interface 750 may also display the current status 770 of various parameters associated with the smart device. Although interface 750 depicts current temperature and of A/C, heat and fan statuses, it should be appreciated that the depicted operational statuses will vary depending upon the functionality associated with the smart device. The interface 750 may also provide a list of soft buttons 780 that enable the homeowner to modify that operation of the smart device. Although the interface 750 displays soft buttons enabling the homeowner to modify the temperature and schedule, and turn off the A/C and fan, it should be appreciated that list of controllable operational parameters will vary depending on the functionality of the smart device. Although FIG. 7B depicts an interface for a smart thermostat, it is envisioned that any individual smart device may be controlled through the interface 750. The exemplary user interfaces may include additional, less, or alternate functionality, including that discussed elsewhere herein.

VII. Exemplary Smart Home Functionality

In one aspect, a computer-implemented method of gathering, analyzing, and using information collected by a smart home controller and/or sensors distributed about a property is described. The method may include (1) populating the appliances, fixtures, and/or areas about the home with sensors integrating the sensors with a smart home control system; (2) remotely gathering data; (3) comparing and analyzing the data and/or automatically learning from such data; (4) automatically detecting real-time issues and/or putting the information gathered to use, such as issuing warnings; (5) automatically performing corrective or preventive actions and/or updating insurance policies or rates, handling insurance claims, and/or performing other insurance-related actions. The method may include additional, fewer, or alternate actions, including those discussed elsewhere herein.

Populating the appliances, fixtures, and/or areas about the property with sensors may include populating the property with sensors by placing stand-alone sensors on appliances, electronics, furniture, and/or fixtures (such as piping, toilets, sinks, walls, floors, roof, etc.). The stand-alone sensors may include a processor, memory, power unit, transceiver, self-powering unit, various types of sensors, and/or other components. Additionally or alternatively, the sensors may be placed on smart appliances, electronics, vehicles, or other items at the time of manufacture. The combination of an appliance with its associated sensors may be referred to collectively as a smart device. The smart device may be capable of wireless or wired communication (or data transmission) with a smart home controller (and/or remote server or processor associated with an insurance provider).

The method may include integrating the smart devices with a smart home control system or local communication network directed by a smart home controller. A smart home controller may include a processor, memory, power unit, transceiver, self-powering unit, sensors, and/or other components. The smart home controller may periodically search for and identify new smart devices associated with the property or homeowner. The smart home controller may be in wireless or wired communication with the smart devices remotely located on or proximate to the property.

Remotely gathering data may include wireless or wired communication with the remotely disbursed smart devices, operating as a smart home wireless or wired home-based communications network. The smart devices may gather data, and continuously and/or periodically transmit that data to the smart home controller. The data gathered may relate to equipment (appliance, electronics, etc.) operation, current conditions (normal, abnormal, accident, etc.), temperature, pressure, water, gas, or air flow, moisture, condensation, e-signatures, motor or pump operating characteristics, temperature, vibration, sound, and/or energy usage, acoustic or visual information (i.e., sound information, photographs, infrared, and/or video), and/or other conditions.

Comparing and/or analyzing the data, and/or automatically learning from the data may include gathering data and building a baseline of expected operating conditions and/or be pre-programming a baseline of expected or normal conditions. Data collected from the smart devices may be compared with expectations or the baseline of normal operating conditions to detect abnormal or hazardous conditions that may lead to property or personal belonging damage and/or loss.

Additionally or alternatively, the smart home controller may learn from the data over time. The smart home controller may learn normal conditions, such as normal temperature or e-signatures, associated with various appliances, electronics, pumps, motors, or other pieces of equipment that are located about the home. As data is collected over time, if the data indicates to the smart home controller that an appliance, piece of electronics, pump, motor, or other piece of equipment has failed, is about to fail, and/or is due for maintenance, the smart home controller may flag the event as an abnormal or hazardous condition.

Automatically detecting real-time issues may include detecting an abnormal or hazardous condition from the data gathered, such as the abnormal conditions noted herein. The abnormal conditions may lead to actual or potential property and/or personal damage or loss.

Other real-time issues may be detected by the smart home controller (and/or a remote server located at, or associated with, an insurance provider) based upon the type of communication or message received from the smart devices. Certain smart devices may send alarm messages that indicate that there is a water or fire hazard. For instance, a smart device may send a communication indicating that the smart device senses water, smoke, a broken component, abnormal energy or water usage for the property or component, low flow from an outlet of a heat source (such as a furnace, heater, dish or clothes washer, clothes dryer, etc.), and/or other abnormal conditions.

Utilizing the information gathered to trigger or perform certain actions may include the smart home controller (and/or a remote server located at the insurance provider), upon detecting an abnormal or hazardous condition, issuing a warning or alert. A wireless communication indicating that an actual or potential issue exists may be sent to the homeowner's electronic or mobile device (smart phone, smart watch, smart glasses, pager, etc.). Additionally or alternatively, the wireless communication containing the alert may be sent to family members, friends, and/or neighbors of the homeowner.

The smart home controller (and/or remote server located at the insurance provider), upon detecting an abnormal or hazardous condition, may automatically perform corrective or preventive actions. The smart home controller may direct, for example, (a) the control of plumbing equipment, fixtures, and/or other components; (b) the shutting of valves to turn off sources of water to the property or individual appliances; (c) powering off or shutting off faulty electrical equipment, appliances, electronics, and/or other components; (d) turning on fire preventive systems (internal or external sprinkler systems and/or other watering systems) and/or de-watering equipment (such as sump pumps); and/or (e) taking other actions, including those discussed elsewhere herein.

Additionally or alternatively, upon detecting a temperature-related issue, the smart home controller (and/or remote server located at the insurance provider) may wirelessly adjust the temperature within the property via a command sent or transmitted to a smart thermostat. More generally, as discussed elsewhere herein, the smart home controller may prevent or mitigate damage that may result from acts of nature, such as windstorms, tornadoes, thunderstorms, rain, hail, snow, ice, flooding, flash flooding, snow melt, and/or other nature or weather-related events.

The smart home controller (and/or remote server located at the insurance provider), upon detecting an abnormal or hazardous condition, may also update insurance policies or rates, handle insurance claims, and/or perform other insurance-related actions. The smart home controller may transmit the data gathered to a remote server or processor via wireless or wired communication located at or associated with the insurance provider. The insurance provider remote server or processor may update insurance policies based upon the data gathered from the smart home controller. Certain rebates or discounts may be offered or recommended based upon smart home functionality. Personal belonging coverage may be adjusted as new smart appliances, electronics, and/or other types of equipment are brought into the interior or exterior of the property, and/or associated recommendations may be presented to the insured via mobile devices (smartphones, etc.) and/or conventional communication techniques (e.g., physical mail, telephone, etc.). The smart home capabilities of the present embodiments may include additional, fewer, or alternate capabilities, including those discussed elsewhere herein.

VIII. Exemplary Mitigation Method

In one aspect, a computer-implemented method of limiting damage to a property may be provided. The property may be populated with a plurality of devices on the property and each of the plurality of devices may be configured to monitor various conditions associated with the property. The method may include (1) receiving, via a first wired or wireless communication network, sensor data from a first at least one of the plurality of devices, the sensor data indicative of at least one potential change in at least one of the various conditions associated with the property; (2) detecting, by one or more processors, a potential insurance-related event associated with the property through analyzing the sensor data; (3) determining, by the one or more processors, a corrective action to be performed by a second at least one of the plurality of devices to mitigate or prevent damage associated with the potential insurance-related event; and/or (4) directing or controlling, by the one or more processors, the second at least one of the plurality of devices to perform the corrective action such that the damage associated with the potential insurance-related event is mitigated or prevented. The received sensor data may include (a) audio data, (b) video data, and (c) operational data. The method may include additional, less, or alternate actions, including those discussed elsewhere herein.

For instance, the directing or controlling the second at least one of the plurality of devices to perform the corrective action may include (1) transmitting, to the second at least one of the plurality of devices via the first communication network, an instruction to mitigate or prevent the potential insurance-related event, wherein the at least one of the plurality of devices executes the instruction; and/or (2) receiving, via the first communication network, a confirmation that the instruction has been executed. The corrective action to be performed by the second at least one of the plurality of devices may include (a) shutting off a water or gas supply; (b) closing a door, window or shutter; (c) turning off an appliance that has failed or is about to fail; and/or (d) turning on a sump pump, de-watering equipment or fire sprinklers.

The method may also include (1) transmitting, to at least one of an individual associated with the property and an insurance provider associated with the property via a second wired or wireless communication network, an alert indicating that the corrective action to mitigate or prevent the potential insurance-related event has been performed, and/or (2) receiving, from the insurance provider via the second communication network, a notification that at least one insurance-related activity has occurred, wherein the insurance-related activity may be (a) an update of an insurance policy or premium, (b) an adjustment of an insurance discount, rebate or award, (c) a processing of an insurance claim, and/or (d) a recommendation to purchase at least one additional device or insurance product.

The method may further include (1) retrieving, by the one or more processors, data from an archival database; (2) examining, by the one or more processors, the data from the archival database to generate a baseline model; (3) comparing, by the one or more processors, the sensor data to the baseline model to identify variations from normal operation; and/or (4) storing, by the one or more processors, the operating data in the archival database. The comparing of the sensor data to the baseline model may include (a) calculating, by the one or more processors, a variance between the sensor data and the baseline model; and/or (b) determining, by the one or more processors, whether the variance is indicative of at least one of: a device of the plurality of devices is failing or the device is about to fail.

The method may still further include receiving, via a second communication network, insurance-related data from at least one of an insurance provider associated with the property and a third party agency that gathers and reports data relevant to insurance risk. The third party agency may be one of (a) a weather agency, (b) a crime reporting agency, (c) a traffic reporting agency, (d) a pollution monitoring agency and/or (e) an insect control agency.

IX. Exemplary Mitigation System

In one aspect, a system for limiting damage to a property may be provided. The property may be populated with a plurality of devices on the property and each of the plurality of devices may be configured to monitor various conditions associated with the property. The system may include (i) a communication module adapted to communicate data; (ii) a memory adapted to store non-transitory computer executable instructions; and/or (iii) one or more processors adapted to interface with the communication module. The one or more processors may be configured to execute the non-transitory computer executable instructions to cause the one or more processors to (1) receive, via the communication module, sensor data from a first at least one of the plurality of devices, the sensor data indicative of at least one potential change in at least one of the various conditions associated with the property; (2) detect, by the one or more processors, a potential insurance-related event associated with the property through analyzing the sensor data; (3) determine, by the one or more processors, a corrective action to be performed by a second at least one of the plurality of devices to mitigate or prevent damage associated with the potential insurance-related event; and/or (4) directing or controlling, by the one or more processors, the second at least one of the plurality of devices to perform the corrective action such that the damage associated with the potential insurance-related event is mitigated or prevented. The system and processors may include additional, less, or alternate functionality, including that discussed elsewhere herein.

For instance, to perform the corrective action, the communication module may be configured to transmit, to at least one of the plurality of devices, an instruction to mitigate or prevent the potential insurance-related event, wherein the at least one of the plurality of devices executes the instruction; and/or receive a confirmation that the instruction has been executed. The corrective action performed by at least one of the second at least one of the plurality of devices may include (i) shutting off a water or gas supply; (ii) closing a door, window or shutter; (iii) turning off an appliance that has failed or is about to fail; and/or (iv) turning on a sump pump, de-watering equipment or fire sprinklers.

The communication module may be further configured to (1) transmit, to at least one of an individual associated with the property and an insurance provider associated with the property, an alert indicating that the corrective action to mitigate or prevent the potential insurance-related event has been performed, and/or (2) receive, from the insurance provider, a notification that at least one insurance-related activity has occurred, wherein the insurance-related activity may be at least one of (i) an update of an insurance policy or premium, (ii) an adjustment of an insurance discount, rebate or award, (iii) a processing of an insurance claim, and/or (iv) a recommendation to purchase at least one additional device or insurance product.

The one or more processors may be further configured to execute the non-transitory computer executable instructions to cause the one or more processors to (1) retrieve, by the one or more processors, data from an archival database; (2) examine, by the one or more processors, the data from the archival database to generate a baseline model; (3) compare, by the one or more processors, the sensor data to the baseline model to identify variations from normal operation; and/or (4) store, by the one or more processors, the operating data in the archival database.

To compare the sensor data to the baseline model the one or more processors may be further configured to execute the non-transitory computer executable instructions to cause the one or more processors to calculate, by the one or more processors, a variance between the sensor data and the baseline model; and/or determine, by the one or more processors, whether the variance is indicative of at least one of: a device of the plurality of devices is failing or the device is about to fail.

The communication module may be further configured to receive insurance-related data from at least one of an insurance provider associated with the property and/or a third party agency that gathers and reports data relevant to insurance risk. In one aspect, to receive the sensor data the communication module may be further configured to receive at least one of audio data, video data, and/or operational data.

X. Exemplary Smart Home Controller

Figure 8:
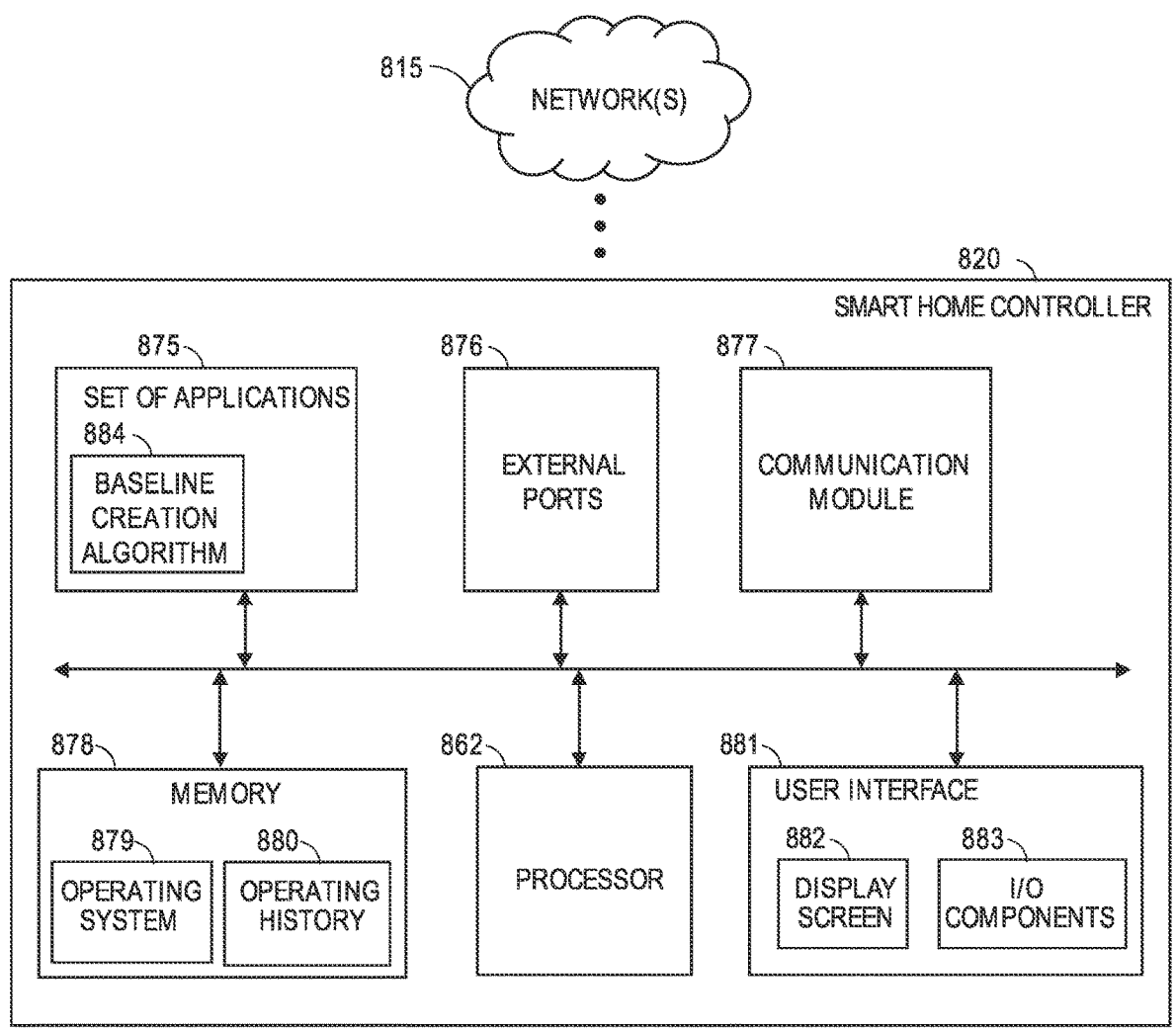
FIG. 8 is a block diagram of a smart home controller in accordance with some embodiments.

FIG. 8 illustrates a diagram of an exemplary smart home controller 820 (such as the smart home controller 120 as discussed with respect to FIG. 1) in which the functionalities as discussed herein may be implemented. It should be appreciated that the smart home controller 820 may be associated with a property, as discussed herein.

The smart home controller 820 may include a processor 822 as well as a memory 878. The memory 878 may store an operating system 879 capable of facilitating the functionalities as described herein. The smart home controller 820 may also store a set of applications 875 (i.e., machine readable instructions). For example, one of the set of applications 875 may be a baseline creation algorithm 884 configured to create a baseline model for normal operation of the plurality of smart devices (and/or associated equipment). It should be appreciated that other applications are envisioned.

The processor 822 may interface with the memory 878 to execute the operating system 879 and the set of applications 875. According to some embodiments, the memory 878 may also include operational history data 880 that includes information related to the operation of the plurality of smart devices on, or proximate to, the property. The baseline creation algorithm 884 may access the operational history 880 to determine an appropriate baseline operation for a smart device. The memory 878 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The smart home controller 820 may further include a communication module 677 configured to communicate data via one or more networks 815. Network(s) 815 may include both a local network for communicating between devices on, or proximate to, the property and a remote network for communicating between the property and external parties. According to some embodiments, the communication module 877 may include one or more transceivers (e.g., WWAN, WLAN, and/or WPAN transceivers) functioning in accordance with IEEE standards, 3GPP standards, or other standards, and configured to receive and transmit data via one or more external ports 876. In some embodiments, the communication module 877 may include separate transceivers configured to interact with the local and remote networks separately. The smart home controller 820 may further include a user interface 881 configured to present information to a user and/or receive inputs from the user. As shown in FIG. 6, the user interface 881 may include a display screen 882 and I/O components 883 (e.g., ports, capacitive or resistive touch sensitive input panels, keys, buttons, lights, LEDs, speakers, microphones). According to the present embodiments, the user may access the smart home controller 820 via the user interface 881 to monitor the status of the plurality of smart devices associated with a property, control the plurality of smart devices associated with the property, and/or perform other functions. In some embodiments, the smart home controller 820 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code is adapted to be executed by the processor 822 (e.g., working in connection with the operating system 879) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

XI. Additional Considerations

As used herein, the term "smart" may refer to devices, sensors or appliances located inside or proximate to a property with the ability to remotely communicate information about the status of the device, sensor, or appliance and/or receive instructions that control the operation of the device, sensor, or appliance. For example, a smart thermostat may be able to remotely communicate the current temperature of the home and receive instructions to adjust the temperature to a new level. As another example, a smart water tank may be able to remotely communicate the level water contained therein and receive instructions to restrict the flow of water leaving the tank. In contrast, "dumb" devices, sensors, or appliances located inside or proximate to a property require manual control. Referring again to the thermostat example, to adjust the temperature on a "dumb" thermostat, a person would have to manually interact with the thermostat. As such, a person may be unable to use a communication network to remotely adjust a "dumb" device, sensor, or appliance.

For simplicity's sake, a "smart device" shall be used herein to refer to any of a smart device, sensor, appliance, and/or other smart equipment that may be disposed on or proximate to a property. In embodiments in which an appliance and a sensor external to the particular appliance are associated with each other, "smart device" may refer to both the external sensors and the appliance collectively. Some examples of devices that may be "smart devices" are, without limitation, valves, piping, clothes washers/dryers, dish washers, refrigerators, sprinkler systems, toilets, showers, sinks, soil monitors, doors, locks, windows, shutters, ovens, grills, fire places, furnaces, lighting, sump pumps, security cameras, and alarm systems. An individual associated with the property shall be referred to as the "homeowner", but it is also envisioned that the individual is a family member of the homeowner, a person renting/subletting the property, a person living or working on the property, a neighbor of the property, an insured, or any other individual that may have an interest in preventing or mitigating damage to the property.

Further, any reference to "home" is meant to be exemplary and not limiting. The systems and methods described herein may be applied to any property, such as offices, farms, lots, parks, and/or other types of properties or buildings. Accordingly, "homeowner" may be used interchangeably with "property owner." As used herein, "property" may also refer to any buildings, belongings and/or equipment disposed on the property itself.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to home or personal property insurance policies, it should be appreciated that an insurance provider may offer or provide one or more different types of insurance policies. Other types of insurance policies may include, for example, condominium owner insurance, renter's insurance, life insurance (e.g., whole-life, universal, variable, term), health insurance, disability insurance, long-term care insurance, annuities, business insurance (e.g., property, liability, commercial auto, workers compensation, professional and specialty liability, inland marine and mobile property, surety and fidelity bonds), automobile insurance, boat insurance, insurance for catastrophic events such as flood, fire, volcano damage and the like, motorcycle insurance, farm and ranch insurance, personal liability insurance, personal umbrella insurance, community organization insurance (e.g., for associations, religious organizations, cooperatives), and other types of insurance products. In embodiments as described herein, the insurance providers process claims related to insurance policies that cover one or more properties (e.g., homes, automobiles, personal property), although processing other insurance policies is also envisioned.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method of limiting damage to a property populated with a plurality of devices on the property, each of the plurality of devices configured to monitor various conditions associated with the property, the method comprising:

receiving, at a smart home controller, sensor data from a plurality of devices, the sensor data indicative of a potential insurance-related event;

identifying, by one or more processors of the smart home controller, a first cause of damage and a second cause of damage associated with the potential insurance-related event;

determining, by the one or more processors, a first corrective action to be performed by a first device of the plurality of devices to mitigate or prevent the first cause of damage and a second corrective action to be performed by a second device of the plurality of devices to mitigate or prevent the second cause damage; and transmitting, from the smart home controller, a first command and a second command, wherein the first command is configured to be executed by the first device to cause the first device to perform the first corrective action, and wherein the second command is configured to be executed by the second device to cause the second device to perform the second corrective action.

2. The computer-implemented method of claim 1, the method further comprising:

receiving, at the smart home controller, a confirmation that the first command has been executed.

3. The computer-implemented method of claim 2, wherein the first corrective action to be performed by the first device of the plurality of devices comprises:

shutting off a water or gas supply.

4. The computer-implemented method of claim 2, wherein the corrective action to be performed by the first device of the plurality of devices comprises:

closing a door, window or shutter.

5. The computer-implemented method of claim 2, wherein the corrective action to be performed by the first device of the plurality of devices comprises:

turning off an appliance that has failed or is about to fail.

6. The computer-implemented method of claim 2, wherein the corrective action to be performed by the first device of the plurality of devices comprises:

turning on a sump pump, de-watering equipment, or fire sprinklers.

7. The computer-implemented method of claim 1, the method further comprising:

transmitting, to at least one of an individual associated with the property and an insurance provider associated with the property, an alert indicating that the first corrective action has been performed.

8. The computer-implemented method of claim 1, the method further comprising:

receiving, from the insurance provider, a notification that at least one insurance-related activity has occurred, wherein the insurance-related activity is at least one of:
an update of an insurance policy or premium,
an adjustment of an insurance discount, rebate, or award,
a processing of an insurance claim, or
a recommendation to purchase at least one additional device or insurance product.

9. The computer-implemented method of claim 1, the method further comprising:

retrieving, by the one or more processors, data from an archival database;
examining, by the one or more processors, the data from the archival database to generate a baseline model;
comparing, by the one or more processors, the sensor data to the baseline model to identify variations from normal operation; and
storing, by the one or more processors, the operating data in the archival database.

10. The computer-implemented method of claim 9, wherein comparing the sensor data to the baseline model comprises:

calculating, by the one or more processors, a variance between the sensor data and the baseline model; and
determining, by the one or more processors, whether the variance is indicative of at least one of: a device of the plurality of devices is failing or the device is about to fail.

11. The computer-implemented method of claim 1, the method further comprising:

receiving, at the smart home controller, insurance-related data from at least one of an insurance provider associated with the property and a third party agency that gathers and reports data relevant to insurance risk.

12. The computer-implemented method of claim 11, wherein the third party agency is at least one of:

a weather agency, a crime reporting agency, a traffic reporting agency, a pollution monitoring agency or an insect control agency.

13. A system for limiting damage to a property populated with a plurality of devices on the property, each of the plurality of devices configured to monitor various conditions associated with the property, the system comprising:

one or more transceivers adapted to communicate data;
a memory adapted to store non-transitory computer executable instructions; and
one or more processors associated with a smart home controller and adapted to interface with the one or more transceivers, wherein the one or more processors are configured to execute the non-transitory computer executable instructions to cause the one or more processors to:

receive, via the one or more transceivers, sensor data from a plurality of devices, the sensor data indicative of a potential insurance-related event;
identify, by the one or more processors, a first cause of damage and a second cause of damage associated with the potential insurance-related event;
determine, by the one or more processors, a first corrective action to be performed by a first device of the plurality of devices to mitigate or prevent the first cause of damage and a second corrective action to be performed by a second device of the plurality of devices to mitigate or prevent the second cause damage; and
transmit, via the one or more transceivers, a first command and a second command, wherein the first command is configured to be executed by the first device to cause the first device to perform the first corrective action, and wherein the second command is configured to be executed by the second device to cause the second device to perform the second corrective action.

14. The system of claim 13, wherein the one or more transceivers are configured to:

receive a confirmation that the first instruction has been executed.

15. The system of claim 13, wherein the corrective action to be performed by the first device of the plurality of devices comprises:

shutting off a water or gas supply.

16. The system of claim 13, wherein the corrective action to be performed by the first device of the plurality of devices comprises:

closing a door, window or shutter.

17. The system of claim 13, wherein the corrective action to be performed by the first device of the plurality of devices comprises:
turning off an appliance that has failed or is about to fail.

18. The system of claim 13, wherein the corrective action to be performed by the first device of the plurality of devices comprises:
turning on a sump pump, de-watering equipment or fire sprinklers.

19. The system of claim 13, wherein the one or more transceivers are further configured to:
transmit, to at least one of an individual associated with the property and an insurance provider associated with the property, an alert indicating that the corrective action has been performed.

20. A non-transitory computer-readable storage medium storing processor-executable instructions, that when executed cause one or more processors to:
receive, at a smart home controller via a communication network, sensor data from a plurality of devices, the sensor data indicative of a potential insurance-related event;

identify, by the one or more processors of the smart home controller, a first cause of damage and a second cause of damage associated with the potential insurance-related event;

determine, by the one or more processors, a first corrective action to be performed by a first device of the plurality of devices to mitigate or prevent the first cause of damage and a second corrective action to be performed by a second device of the plurality of devices to mitigate or prevent the second cause damage; and transmit, from the smart home controller via the communication network, a first command and a second command, wherein the first command is configured to be executed by the first device to cause the first device to perform the first corrective action, and wherein the second command is configured to be executed by the second device to cause the second device to perform the second corrective action.

* * * * *